(12) United States Patent
Karaoguz

(10) Patent No.: US 7,554,965 B2
(45) Date of Patent: Jun. 30, 2009

(54) UWB (ULTRA WIDE BAND) WAVEFORM DESIGN TO MINIMIZE NARROWBAND INTERFERENCE

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1183 days.

(21) Appl. No.: 10/668,648

(22) Filed: Sep. 23, 2003

(65) Prior Publication Data

US 2004/0233972 A1 Nov. 25, 2004

Related U.S. Application Data

(60) Provisional application No. 60/472,336, filed on May 21, 2003, provisional application No. 60/473,776, filed on May 28, 2003.

(51) Int. Cl.
*H04B 7/216* (2006.01)

(52) U.S. Cl. ...................................... 370/342

(58) Field of Classification Search ................. 370/342; 455/465.1
See application file for complete search history.

(56) References Cited

U.S. PATENT DOCUMENTS 6,603,818 B1 * 8/2003 Dress et al. ................ 375/295
6,697,628 B1 * 2/2004 Green et al. ............. 455/456.1
7,149,529 B2 * 12/2006 Parry ....................... 455/456.1
7,184,787 B2 * 2/2007 Mallette ..................... 455/508
2004/0008641 A1 * 1/2004 Sugaya et al. ............... 370/321
2004/0048574 A1 * 3/2004 Walker et al. .............. 455/63.1

OTHER PUBLICATIONS

Federal Communications Commission (FCC), "FCC 02-48", Feb. 14, 2002, Revision of Part 15 of the Commission's Rules Regarding Ultra-Wideband Transmission Systems.*

* cited by examiner

*Primary Examiner*—Edan Orgad
*Assistant Examiner*—Blanche Wong
(74) *Attorney, Agent, or Firm*—Garlick Harrison & Markison; Shayne X. Short

(57) ABSTRACT

UWB (Ultra Wide Band) waveform design to minimize narrowband interference. A novel solution is presented such that a PN (Pseudo-Noise) code may be intelligently designed so as to null portions of a UWB spectrum that have a significant amount of noise. These narrowband blocking intervals will effectively block off all of the interference within these portions of the UWB signal. These spectrum portions having interference may be predetermined beforehand or determined by one or more of the devices within the communication system; in addition, any changes in the interference may also be assessed in real time or successively (e.g., after the elapse of every predetermined period of time). Moreover, the position of the devices within the communication system may also be employed when selecting the nulling codes, and they may be adaptively changed, in real time, to respond to changes in the interference and/or changes in the devices' positions.

84 Claims, 20 Drawing Sheets multiple access device specific PN code assignment to minimize narrowband interference
(different devices use different PN codes)

piconet (shown in wireless communication system embodiment)

CDMA (Code Division Multiple Access)

DSSS (Direct Sequence Spread Spectrum)

piconet performing PN code assignment using prior knowledge of interference piconet performing PN code assignment using interference assessment position determination of devices in a piconet (shown in a radial embodiment)

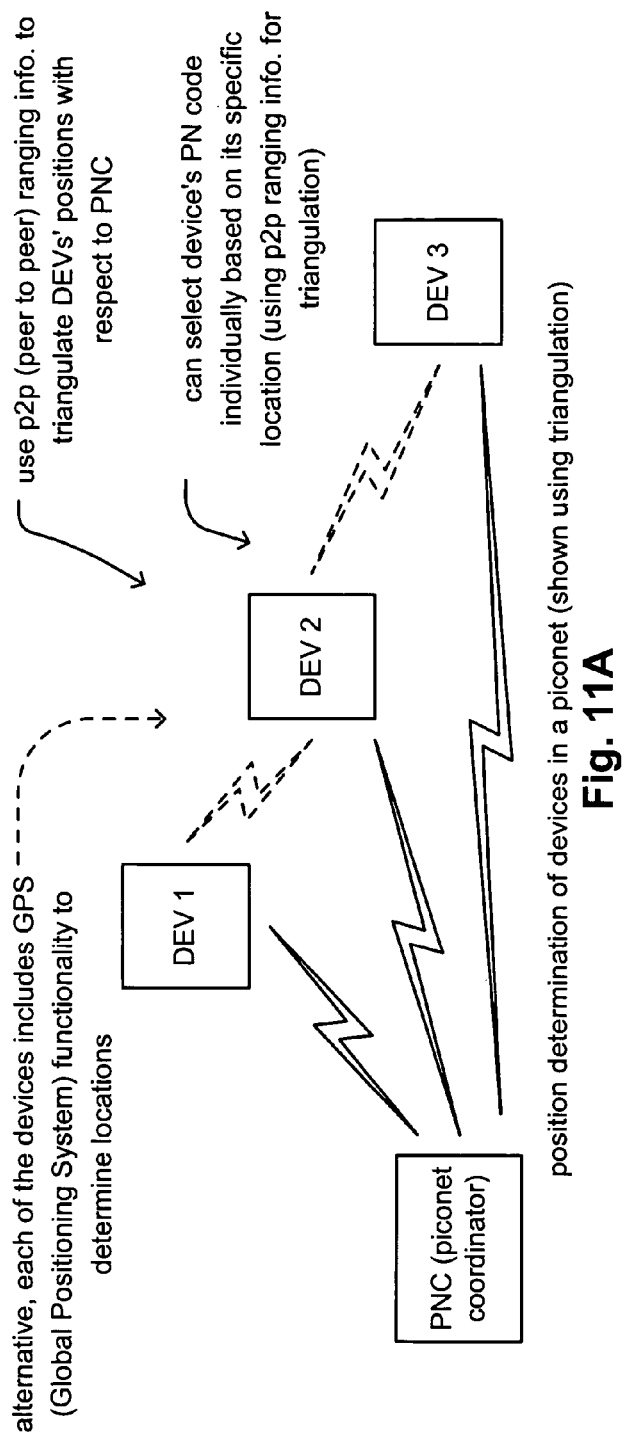
Fig. 11A position determination of devices in a piconet (shown using triangulation)
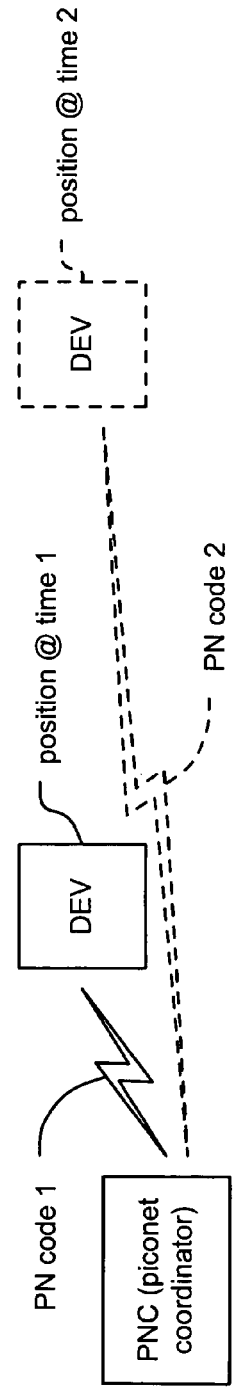
Fig. 11B position determination of devices in a piconet (shown accommodating changes in positions)

piconet performing PN code assignment using prior knowledge of interference and position determination piconet performing PN code assignment using prior knowledge of interference, position determination, and interference assessment

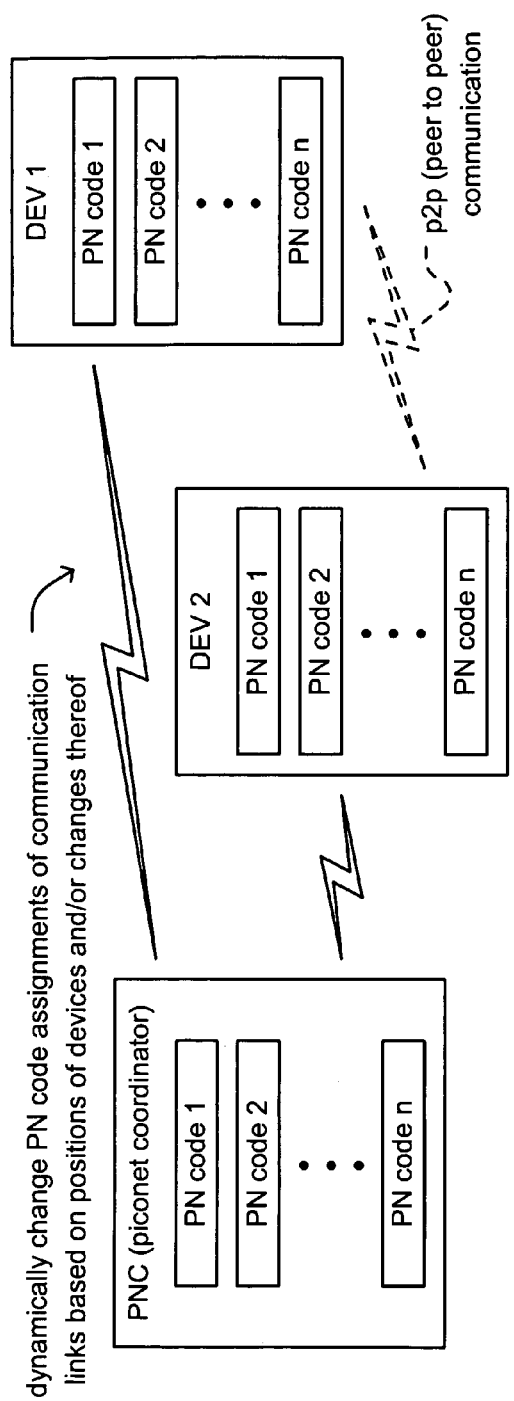
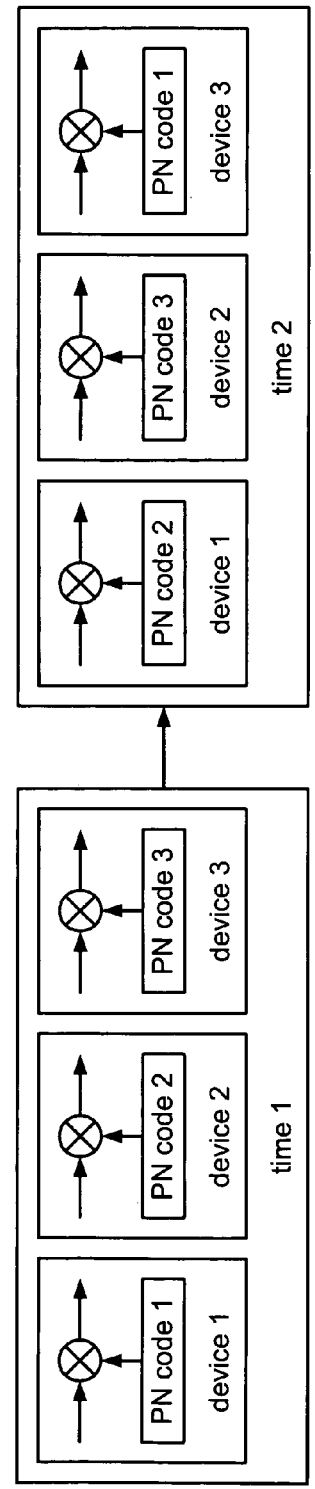

UWB (Ultra Wide Band) waveform design using DSSS (Direct Sequence Spread Spectrum)

UWB (Ultra Wide Band) waveform design using CDMA (Code Division Multiple Access)

piconet operating method piconet operating method

UWB (ULTRA WIDE BAND) WAVEFORM DESIGN TO MINIMIZE NARROWBAND INTERFERENCE

CROSS REFERENCE TO RELATED PATENTS/PATENT APPLICATIONS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:
1. U.S. Provisional Application Ser. No. 60/472,336, entitled "Position based WPAN (Wireless Personal Area Network) management," filed May 21, 2003 (May 21, 2003), pending.
2. U.S. Provisional Application Ser. No. 60/473,776, entitled "UWB (Ultra Wide Band) waveform design to minimize narrowband interference," filed May 28, 2003 (May 28, 2003), pending.

The following U.S. Utility Patent Application, being filed concurrently, is hereby incorporated herein by reference in its entirety and made part of the present U.S. Utility Patent Application for all purposes:
1. U.S. Utility Patent Application Ser. No. 10/668,527, entitled "Position based WPAN (Wireless Personal Area Network) management," filed Sep. 23, 2003 (Sep. 23, 2003), pending.

BACKGROUND OF THE INVENTION

1. Technical Field of the Invention

The invention relates generally to communication systems; and, more particularly, it relates to managing communications within such communication systems.

2. Description of Related Art

Data communication systems have been under continual development for many years. In recent years, the development of piconet type communication systems has been under increasing development. A piconet may be viewed as a network that is established when two devices connect to support communication of data between themselves. Sometimes, piconets are referred to as PANs (Personal Area Networks). These piconets typically operate within a region having a radius of up to approximately 10 meters.

As is known, the Bluetooth® communication standard is the first such PAN communication standard that has been developed. In accordance with the Bluetooth® communication standard, the communication between the various devices in such a piconet is strictly performed using an M/S (Master/Slave) configuration. Each of the devices within such a Bluetooth® piconet is M/S capable. Typically one of the devices (sometimes referred to as piconet controller in this situation), or a first device within the Bluetooth® piconet, transmits a beacon signal (or an access invitation signal) while operating as the "master" device of the Bluetooth® piconet to the other "slave" devices of the Bluetooth® piconet. In other words, the "master" device of the Bluetooth® piconet polls the other "slave" devices to get them to respond.

However, other piconets may be implemented such that the devices do not operate according to such an M/S (Master/Slave) type relationship. In such instances, various piconet operable devices operate may be referred to as PNCs (piconet coordinators) and DEVs (user piconet devices that are not PNCs). The PNCs operate to coordinate the communication between themselves and the DEVs within the piconet. Sometimes, such a PNC may be implemented to operate as a master with respect to the 1 or more DEVs that operate as slaves, but this need not be the case in all instances—the strict M/S relationship is typically the case only in a Bluetooth® piconet.

In even some other instances, two or more piconets operate cooperatively such that at least two piconets operate such that they share at least one common device in a scatternet implementation. For example, in a scatternet, a single DEV may interact with two or more PNCs. This implementation will allow various devices within different piconets that are located relatively far from one another to communicate through the PNCs of the scatternet. However, within a scatternet implementation, a problem may arise such that each of the individual piconets must be able to operate in relative close proximity with other piconets without interfering with one another. This inherently requires a great deal of synchronization between the piconets, which may be very difficult to achieve in some instances. It is also noted that independently operating piconets, not implemented within a scatternet implementation, may also suffer from deleterious effects of interference with other piconets located within relative close proximity.

Some PAN communication standards and recommended practices have been developed (and some are still being developed) by the IEEE (Institute of Electrical & Electronics Engineers) 802.15 working group. These standards and recommended practices may generally be referred to as being provided under the umbrella of the IEEE 802.15 working group. Perhaps the most common standard is the IEEE 802.15.1 standard which adopts the core of Bluetooth® and which generally can support operational rates up to approximately 1 Mbps (Mega-bits per second).

The IEEE 802.15.2 recommended practice specification has been developed in an effort to support the co-existence of the IEEE 802.15.1 Bluetooth® core with virtually any other wireless communication system within the approximate 2.4 GHz (Giga-Hertz) frequency range. As some examples, the IEEE 802.11a and IEEE 802.11g WLAN (Wireless Local Area Network) standards both operate within the approximate 2.4 GHz frequency range. This IEEE 802.15.2 recommended practice specification has been developed to ensure that such a WLAN and a piconet may operate simultaneously within relatively close proximity of one another without significant interference with one another.

In addition, the IEEE 802.15.3 high data rate PAN standard has been developed in an effort to support operational rate up to approximately 55 Mbps. In this IEEE 802.15.3 standard, the PNCs and DEVs do not operate according to an M/S relationship as they do according to Bluetooth®. In contradistinction, a PNC operates generally as an AP (Access Point) and manages the various DEVs such that they are guaranteed to perform their respective communication according to their appropriate time slots thereby ensuring proper performance and operation within the piconet. An extension of the IEEE 802.15.3 high data rate PAN standard is the IEEE 802.15.3 WPAN (Wireless Personal Area Network) High Rate Alternative PHY Task Group 3a (TG3a). This is sometimes referred to the IEEE 802.15.3a extended high data rate PAN standard, and it can support operational rates up to 480 Mbps Yet another standard developed by the IEEE 802.15 working group is the IEEE 802.15.4 low data rate PAN standard that generally supports data rates within the range of approximately 10 kbps (kilo-bits per second) and 250 kbps.

As piconets are currently being developed in conjunction with many of the other wireless communication systems (e.g., the various IEEE 802.11 communication systems—including IEEE 802.11a and IEEE 802.11b WLANs (Wireless Local Area Networks)), there is a possibility that the various wireless communication systems may interfere with one another. Many of these other wireless communication systems operate using narrowband signals centered around well known frequencies. For example, the IEEE 802.11a standard typically operates around the spectrum of 5 GHz (Giga-Hertz), and the IEEE 802.11b standard, as well as the IEEE 802.11g standard, typically operates around the spectrum of 2.4 GHz. When a piconet operates in relatively close proximity to these types of communication system (or other wireless communication systems) there is a relatively high possibility that the piconet may experience interference when employing signals operating around these frequency ranges. There does not presently exist in the art, or on the draft proposals currently being developed in the piconet technology space, a means by which interference may be effectively eliminated from the signals being transmitted therein.

BRIEF SUMMARY OF THE INVENTION

Various aspects of the invention can be found in a piconet that employs PN (Pseudo-Noise) codes to spread UWB (Ultra Wide Band) pulses to minimize narrowband interference. The piconet includes a PNC (piconet coordinator) and a plurality of DEVs (user piconet devices). Each DEV of the plurality of DEVs and the PNC is operable to communicate with one another using UWB pulses. Based on narrowband interference within a spectrum of the UWB pulses that are transmitted across a communication link within the piconet, the PNC assigns a PN code from a plurality of PN codes to spread the UWB pulses transmitted across the communication link. The assigned PN code has at least one narrowband blocking interval that substantially nulls at least one portion of the spectrum of the UWB pulses around which the narrowband interference is substantially centered thereby substantially eliminating the narrowband interference. When transmitting a UWB pulse across the communication link, at least one DEV of the plurality of DEVs and the PNC spreads the UWB pulse using the PN code that is assigned from the plurality of PN codes.

In certain embodiments, the narrowband interference itself is substantially centered around a predetermined frequency. That is to say, the location (in terms of frequency) of the narrowband interference is known beforehand. This predetermined frequency may be approximately 2.4 GHz (Giga-Hertz) or approximately 5 GHz. The interference substantially centered around approximately 5 GHz may be generated by an IEEE (Institute of Electrical & Electronics Engineers) 802.11a WLAN (Wireless Local Area Network), and the interference substantially centered around approximately 2.4 GHz may be generated by an IEEE 802.11b WLAN (or an an IEEE 802.11g WLAN). In addition, the regions in which either one of the 802.11 WLANs operates may also be predetermined.

The piconet may perform ranging of the various devices to determine their relative location with respect to one another. One way to do this is as follows: the PNC transmits UWB pulses to each DEV within the plurality of DEVs. Then, after receiving its respective UWB pulse, each DEV within the plurality of DEVs transmits a UWB pulse back to the PNC. Finally, the PNC performs ranging of the relative position of each DEV within the plurality of DEVs using a time duration of a round trip of the transmitted UWB pulse and the received UWB pulse thereby determining the relative distance between the PNC and each DEV within the plurality of DEVs. The PNC may then assign the PN code based on the relative distance between the PNC and at least one DEV of the plurality of DEVs. Ranging may also be performed between two DEVs within the piconet. This information, in conjunction with ranging that is performed between the PNC and the two DEVs may be used to perform triangulation thereby determining the specific locations of the two DEVs with respect to each other and the PNC.

Alternatively, the positions of the devices within the piconet may be performed using GPS (Global Positioning System) functionality contained within the devices. For example, the PNC may include GPS functionality that is operable to determine the specific location of the PNC within a degree of precision, and each DEV of the plurality of DEVs includes GPS functionality that is operable to determine the specific location of that DEV within the degree of precision. Each DEV of the plurality of DEVs may communicate information corresponding to its specific location to the PNC so that the PNC has information corresponding to the locations of all of the devices within the piconet. The PNC may then assign the PN code based on the specific location of at least one DEV of the plurality of DEVs.

The PNC may also include interference assessment functionality that is operable to identify a frequency around which the narrowband interference is substantially centered. This interference assessment functionality may operate as follows: the PNC and each DEV of the plurality of DEVs operate in a silence mode for a predetermined period of time. The PNC monitors noise within the piconet when operating in the silence mode for the predetermined period of time. The PNC performs an FFT (Fast Fourier Transform) of the noise thereby generating a PSD (Power Spectral Density) of the noise. The PNC then identifies a peak within the PSD to identify the frequency around which the narrowband interference is substantially centered. Again, the frequency around which this narrowband interference may be substantially centered may be approximately 2.4 GHz or approximately 5 GHz as generated by an IEEE 802.11b WLAN (or IEEE 802.1g WLAN) or an IEEE 802.11a WLAN, respectively.

The UWB pulses employed within the piconet may be implemented using a variety of different techniques including CDMA (Code Division Multiple Access) or DSSS (Direct Sequence Spread Spectrum). The PNC may also perform re-assignment of a different PN code based on either one or both of a change in a frequency around which the narrowband interference is substantially centered or based on a change in a position of at least one DEV of the plurality of DEVs and the PNC.

The PNC may also set up p2p (peer to peer) communication between two DEVs of the plurality of DEVs, and a PN code may be specifically assigned to spread the UWB pulses transmitted between those two DEVs.

The UWB pulses employed herein may be generated using a frequency band of a UWB frequency spectrum that spans from approximately 3.1 GHz (Giga-Hertz) to approximately 10.6 GHz. The UWB frequency spectrum may be divided into a plurality of frequency bands, and each frequency band of the plurality of frequency bands has a bandwidth of approximately 500 MHz (Mega-Hertz).

BRIEF DESCRIPTION OF THE SEVERAL VIEWS OF THE DRAWINGS

FIG. 11A is a diagram illustrating an embodiment of position determination of devices in a piconet according to the invention (shown using triangulation).

FIG. 11B is a diagram illustrating an embodiment of position determination of devices in a piconet according to the invention (shown accommodating changes in positions).

FIG. 14A is a diagram illustrating an embodiment of dynamic re-assignment of PN codes within a piconet according to the invention (shown using a finite set of PN codes stored within devices).

FIG. 14B is a diagram illustrating an embodiment of dynamic re-assignment of PN codes for multiple devices as a function of time according to the invention.

DETAILED DESCRIPTION OF THE INVENTION

Figure 1A:
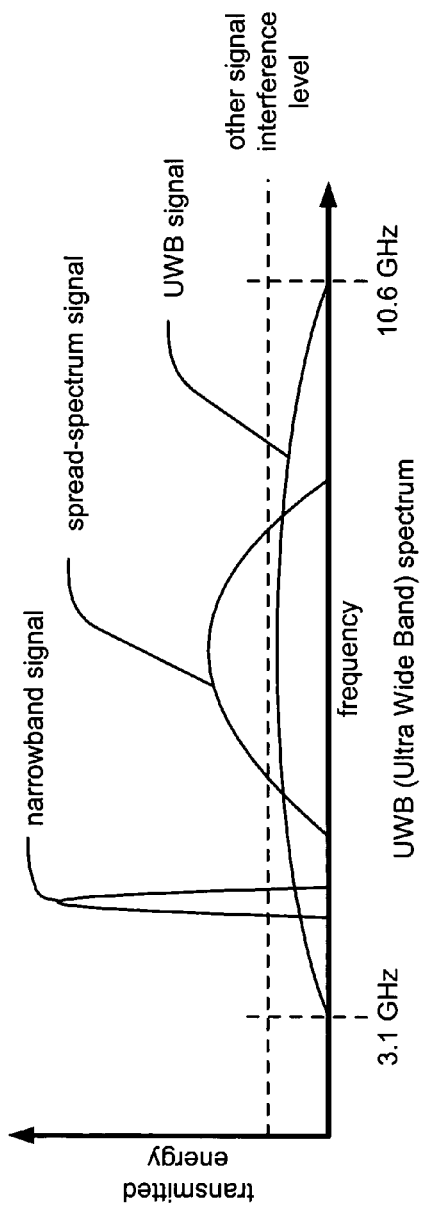
FIG. 1A is a diagram illustrating an embodiment of the frequency spectrum of a UWB (Ultra Wide Band) signal when compared to some other signal types according to the invention.

FIG. 1A is a diagram illustrating an embodiment of the frequency spectrum of a UWB (Ultra Wide Band) signal when compared to some other signal types according to the invention. In contradistinction to RF (Radio Frequency) communications that operate by using a narrowband frequency carrier to transmit information, UWB communications operate by sending pulses of energy across a broad frequency spectrum. For example, an RF signal may be viewed as occupying the range of spectra of a narrowband frequency. Also, in contradistinction to a spread-spectrum signal whose PSD (Power Spectral Density) generally rises above the PSDs of other interfering signals within an available spectrum and also occupies a relatively narrower portion of the available spectrum, a UWB signal may actually be viewed as being a pulse shaped signal (that may never exceed the PSDs of other interfering signals within the available spectrum). A spread-spectrum signal may be viewed a signal that occupies a frequency band that is much wider than the minimum bandwidth required by the information signal. For example, a transmitter "spreads" the energy (that is typically originally concentrated in narrowband) across a wider frequency band. One benefit of a spread-spectrum signal is that it provides increased immunity with respect to narrowband interference. A narrowband signal will not fully obliterate the UWB signal because of the much wider bandwidth of the UWB signal. It is also important to note that a UWB signal may also be characterized as a function of time, not frequency.

Figure 1B:
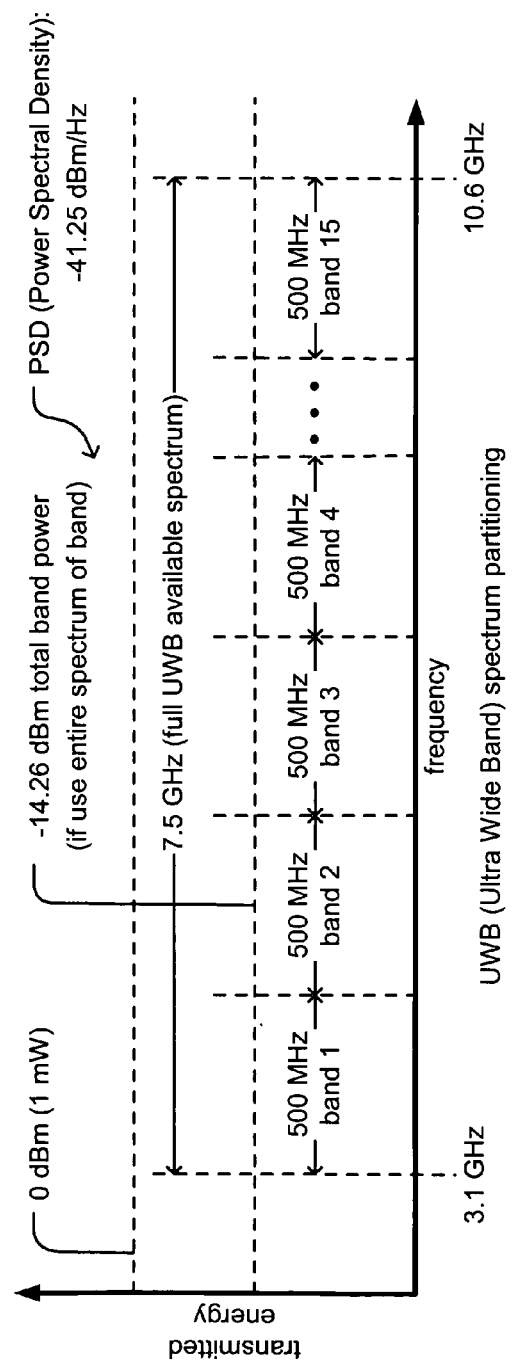
FIG. 1B is a diagram illustrating an embodiment of UWB (Ultra Wide Band) spectrum partitioning into a plurality of sub-bands according to the invention.

FIG. 1B is a diagram illustrating an embodiment of UWB (Ultra Wide Band) spectrum partitioning into a plurality of sub-bands according to the invention. Relatively recently, the FCC (Federal Communications Commission) has defined the available spectrum for UWB communications as being between 3.1 GHz (Giga-Hertz) and 10.6 GHz. In addition, the FCC defined the minimum spectral width of any UWB signal within the available UWB spectrum to be 500 MHz (Mega-Hertz).

Moreover, this FCC definition allows for a PSD across the UWB spectrum of −41.25 dBm/MHz of bandwidth. As a reminder, 0 dBm is the decibel (dB) measure of power of a signal referenced to 1 mW (milli-Watt). This means that the total power that may be employed by a UWB signal is approximately −14.26 dBm in any individual 500 MHz sub-band within the entire available UWB bandwidth of 7.5 GHz. In addition, if a pulse is sent using the entire 7.5 GHz of available UWB bandwidth, then the total transmitted power of a UWB signal is approximately −2.5 dBm.

Figure 2:
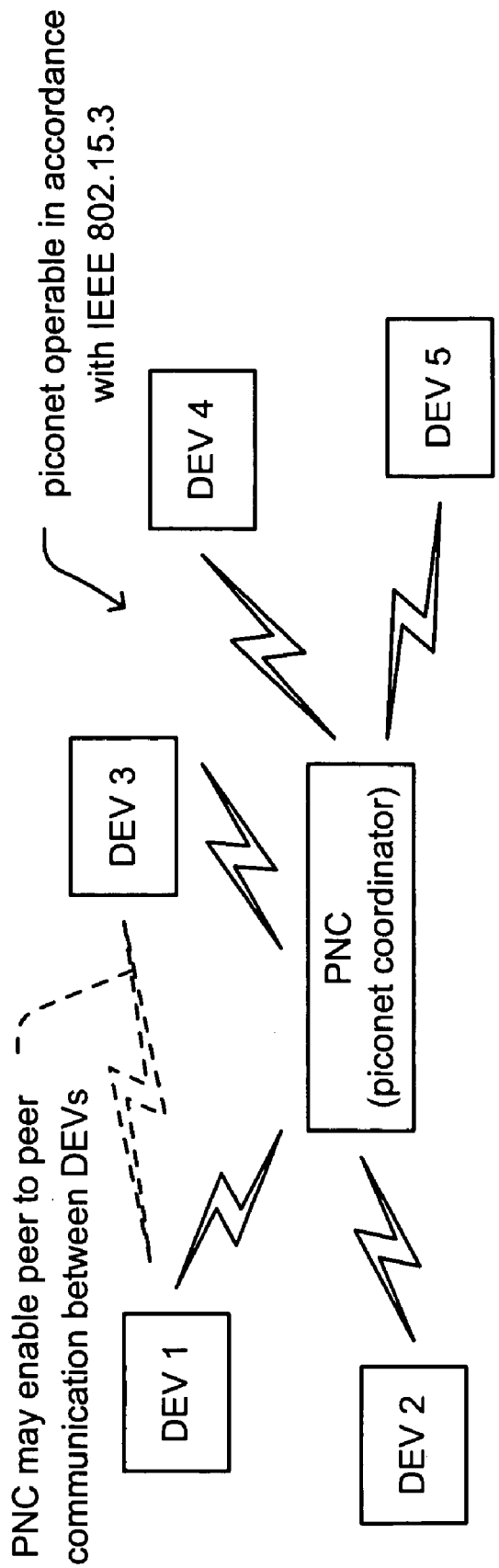
FIG. 2 is a diagram illustrating an embodiment of a piconet (shown as a wireless communication system) that is built according to the invention.

FIG. 2 is a diagram illustrating an embodiment of a piconet (shown as a wireless communication system) that is built according to the invention. As described briefly above, a piconet may be viewed as being the network that is established when any two devices connect to support communication between them. The piconet may be implemented using a PNC (piconet coordinator) and 1 or more DEVs (piconet devices). In some instances, the DEVs do not communication directly with one another, but with each other through the PNC.

To support communication between each of the DEVs, simultaneously at some times, and the PNC, the communication must be implemented in such a way that the communication links between each DEV and the PNC will not interfere with the other communication links in any other SOP (Simultaneously Operating Piconet) within a relatively close proximity. That is to say, when two or more piconets operate within relatively close proximity to one another, the communication within each of the respective piconets must be implemented in such a way that simultaneously operation of the two or more piconets (e.g., the coexistence and operation) may be performed without interfering with one another. It is also noted that the PNC may also operate to enable p2p (peer to peer) communication between two DEVs within a piconet. Moreover, the piconet in this embodiment, as well as within other embodiments described herein are operable in accordance with the constraints provided by the IEEE 802.15.3a standard and may also be implemented such that the piconet is operable in accordance with other wireless communication standards as well.

Figure 3:
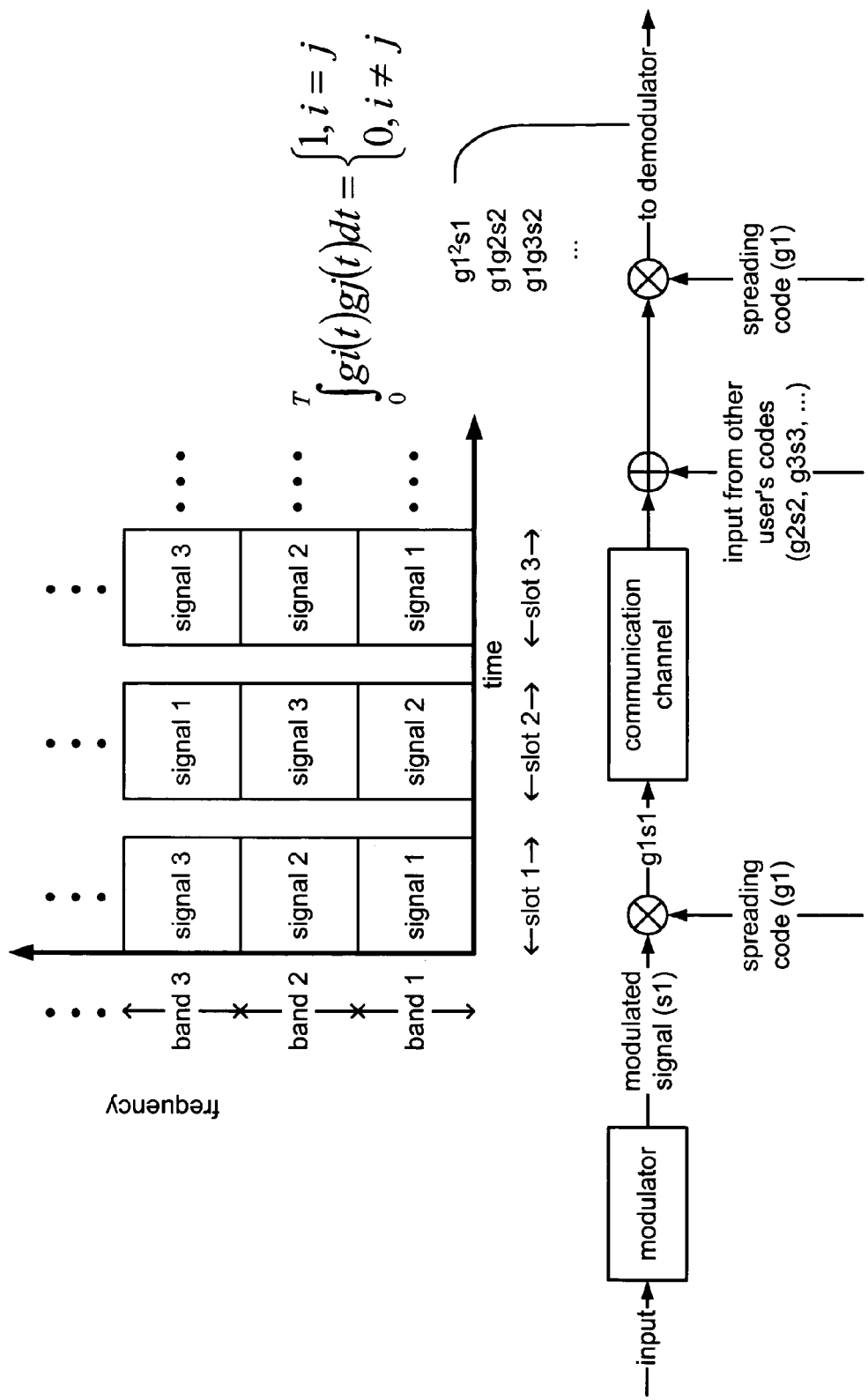
FIG. 3 is a diagram illustrating an embodiment of CDMA (Code Division Multiple Access) that may be employed according to the invention.

FIG. 3 is a diagram illustrating an embodiment of CDMA (Code Division Multiple Access) that may be employed according to the invention. CDMA may be viewed as the short term assignment of a frequency band to various signal sources. At each successive time slot, the band assignments are reordered either adaptively or according to a predetermined sequence. For example, during a time slot 1, a signal 1 operates using a band 1, a signal 2 operates using a band 2, and a signal 3 operates using a band 3. Then, during a time slot 2, the signal 1 operates using the band 3, the signal 2 operates using the band 1, and the signal 3 operates using the band 2. During a time slot 3, the signal 1 operates using the band 1, the signal 2 operates using the band 2, and the signal 3 operates using the band 3.

The operation of communication devices (e.g., users) is performed using a PN (Pseudo-Noise) code that is typically orthogonal to the other PNs codes employed by the other communication devices within the communication system. This PN code is oftentimes referred to as a spreading code. A modulated signal is spread using that spreading code and the spread signal is then transmitted across a communication channel (e.g., a PHY (physical layer) link that communicatively couples 2 devices within the piconet). At a receiver end of the communication channel, this same spreading code (e.g., this PN code) is employed to de-spread the code so that data sent from a particular device may be demodulated by the appropriate destination device.

The operation of CDMA may be better understood when viewed as the transformation of an input signal through a communication system. At a transmitter end of a communication channel, input from a particular user is first provided to a modulator where the data is modulated by a carrier thereby generating a modulated signal (s1). Next, the data-modulated signal is then multiplied by a spreading code (g1) that corresponds to that particular user thereby generating a spread signal (g1s1) that is then provided to the communication channel. This signal may be viewed as a convolution of the frequency spectrum of the modulated signal and the frequency spectrum of the spreading code. Simultaneously, input from other users within the communication system is modulated and spread in an analogous manner.

At the receiver end of the communication channel, a linear combination of all of the spread signals provided by the other users is received, e.g., g1s1+g2s2+g3s3+ . . . and so on for all of the users. At the receiver end, the total received signal is then multiplied by the spreading code (g1) thereby generating a signal that includes $g1^2 s1$ plus a composite of the undesired signal (e.g., g1g2s2+g1g3s3+ . . . and so on).

In CDMA, the spreading codes are typically chosen such that they are orthogonal to one another. That is to say, when any one spreading code is multiplied with another spreading code, the result is zero. This way, all of the undesired signals drop out. Given that the spreading codes g1(t), g2(t), g3(t) and so on, the orthogonality of the spreading codes may be represented as follows:

$$\int_0^T gi(t)gj(t)dt = \begin{cases} 1, & i=j \\ 0, & i \neq j \end{cases}$$

This final signal is then passed to a demodulator where the input that has been provided at the transmitter end of the communication channel is extracted and a best estimate is made thereof.

Figure 4:
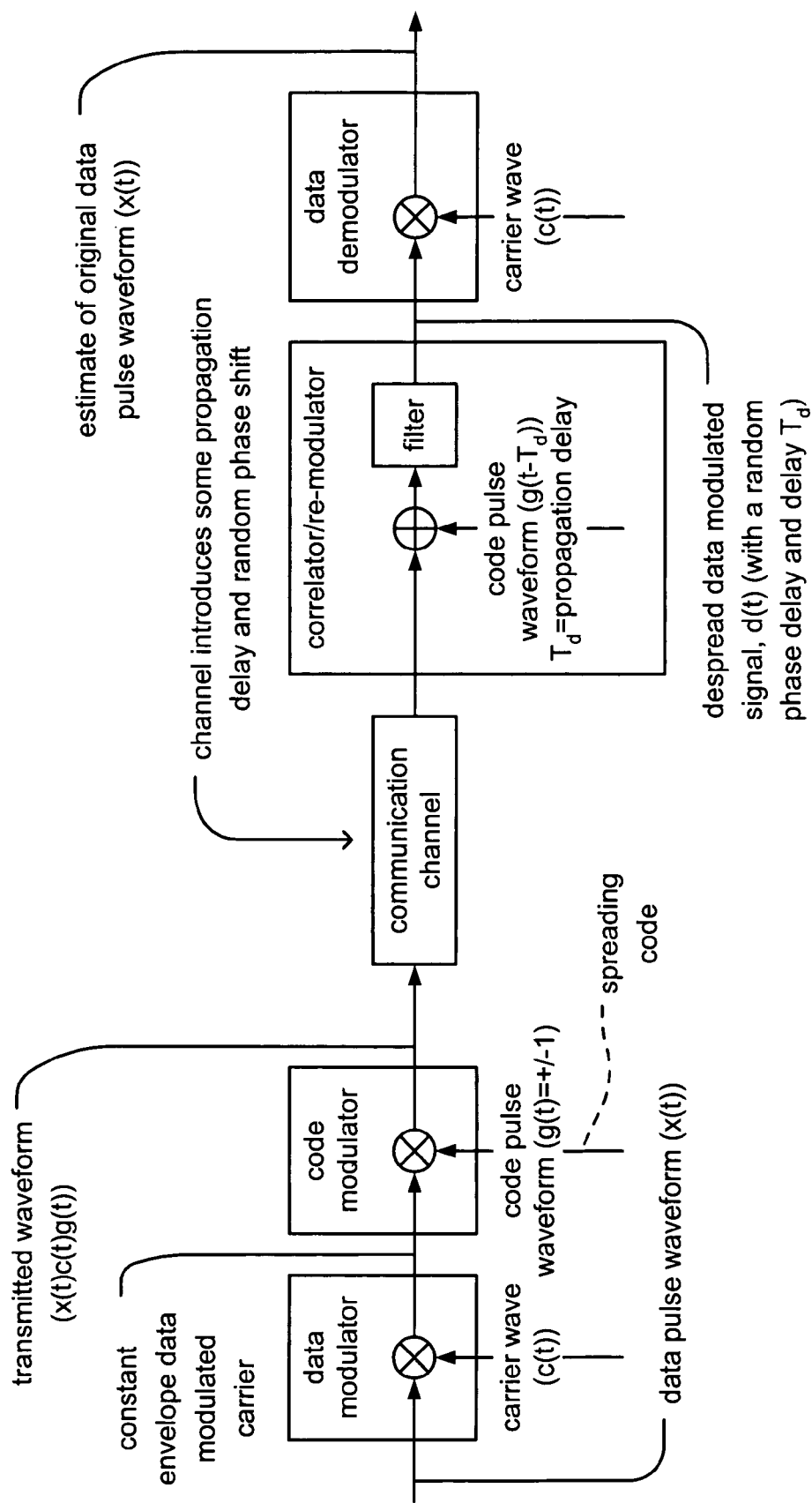
FIG. 4 is a diagram illustrating an embodiment of DSSS (Direct Sequence Spread Spectrum) that may be employed according to the invention.

FIG. 4 is a diagram illustrating an embodiment of DSSS (Direct Sequence Spread Spectrum) that may be employed according to the invention. The terminology "direct sequence" is typically provided to such functionality based on the spectrum spreading technique that is employed such that a carrier wave is first modulated with a date signal, and that data modulated signal is then modulated again with a high speed (wideband) spreading signal. In certain embodiments within this specification, the high speed (wideband) spreading signal may be viewed as being a Walsh-Hadamard code or a PN (Pseudo-Noise) code.

Within this diagram, a data pulse waveform (shown as x(t)) is provided to a data modulator that modulates the data pulse waveform with a carrier wave (shown as c(t)). The carrier wave, c(t), may be viewed a constant envelope signal having a radian frequency, $\omega_0$. The carrier wave may be represented as follows:

$$c(t) = \sqrt{2P} \cos(\omega_0 t)$$

The constant envelope data modulated carrier having a constant power, P, radian frequency, $\omega_0$, and data phase modulation, $\theta_x(t)$, may be represented as follows:

$$s_x(t) = \sqrt{2P} \cos[\omega_0 t + \theta_x(t)]$$

This signal is then modulated using a spreading signal, g(t), that may be a code pulse waveform of values +1 and −1. The transmitted signal, x(t)·c(t)·g(t), that is provided to a communication channel may then be represented as follows:

$$s(t) = \sqrt{2P} \cos[\omega_0(t) + \theta_x(t) + \theta_g(t)]$$

where the phase of the carrier has 2 separate components:
$\theta_x(t)$, due to the data, and
$\theta_g(t)$, due to the spreading sequence.

The communication channel will introduce some propagation delay and random phase shift to the signal transmitted across it.

At the other end of the communication channel (e.g., at the receiver end of the communication channel), demodulation of the received signal is performed by correlating or re-modulating the received signal with a synchronized replica of the original spreading signal, which may be represented as g(t−$\hat{T}_d$). The value $\hat{T}_d$ is the receiver's estimate of the actual propagation delay of the communication channel, $T_d$, from the transmitter to the receiver. In the absence of noise and interference, the output signal from the correlator/re-modulator (e.g., the despread data modulated signal, d(t)) may be represented as follows:

$$d(t) = A\sqrt{2P}x(t-T_d) \cdot g(t-T_d) \cdot g(t-\hat{T}_d) \cdot \cos[\omega_0(t-T_d) + \phi]$$

where A is a system gain parameter, and $\phi$ is a random phase angle on the range $(0, 2\pi)$. Since $g(t) = \pm 1$, the product $g(t-T_d) \cdot g(t-\hat{T}_d)$ will be unity if $T_d = \hat{T}_d$, that is, if the code signal at the receiver is exactly synchronized with the code signal at the transmitter. When it is synchronized, the output of the receiver correlator/re-modulator, d(t), is the despread data modulated signal (except for a random phase $\phi$ and delay $T_d$). The despreading correlator/re-modulator is then followed by a demodulator for recovering the data that provides an estimate of the original data pulse waveform, x(t).

Figure 5:
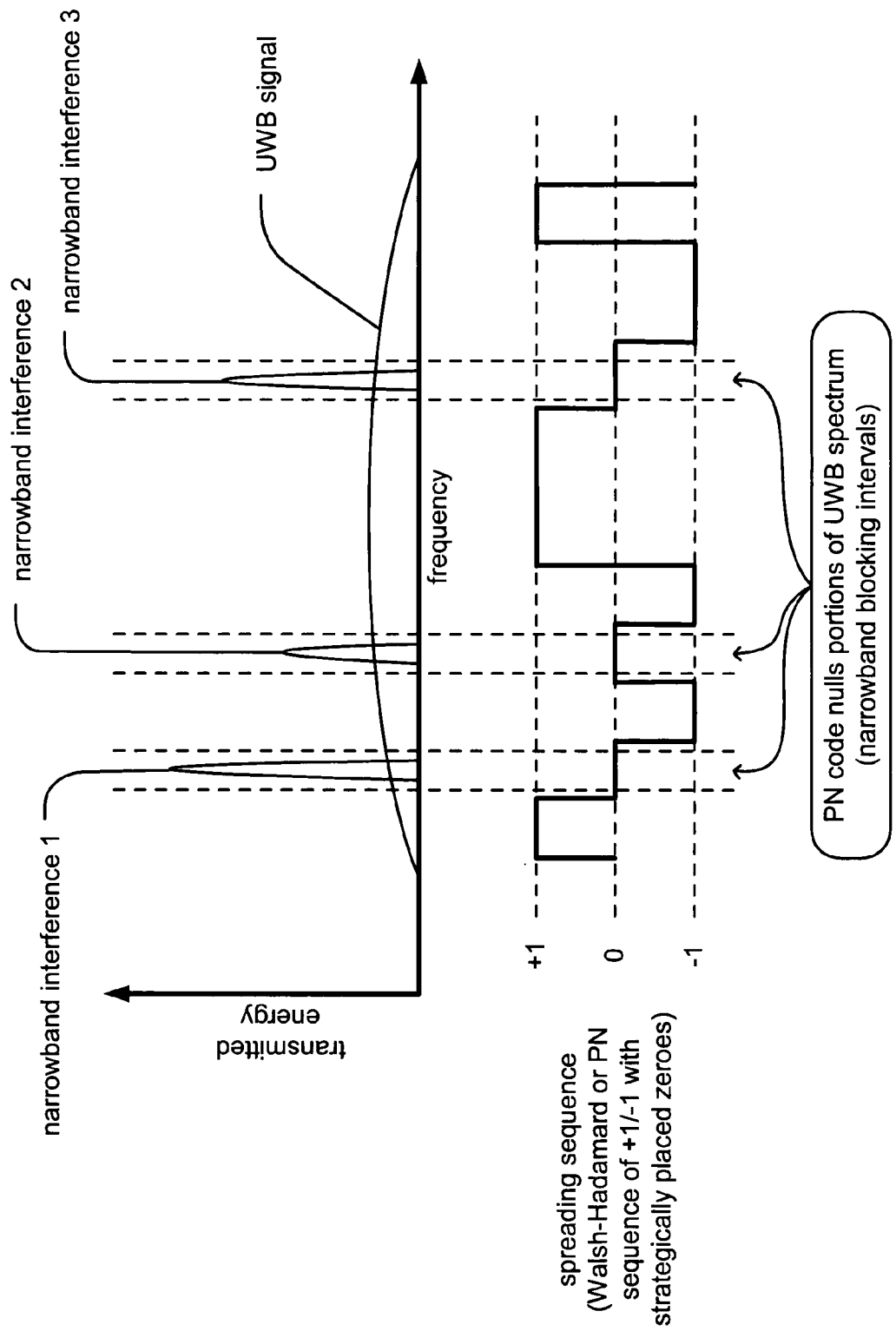
FIG. 5 is a diagram illustrating an embodiment of a PN (Pseudo-Noise) code selectively nulling out narrowband interference within a UWB signal according to the invention.

FIG. 5 is a diagram illustrating an embodiment of a PN (Pseudo-Noise) code selectively nulling out narrowband interference within a UWB signal according to the invention.

The PSD (Power Spectral Density) of the spectrum of a UWB signal is shown where one or more narrowband interferes are also present. The PSD of the one or more narrowband interferers is significantly much narrower than the PSD of the UWB signal, and the peaks of the one or more narrowband interferers is much higher than the peak of UWB signal. A spreading code is employed to spread the UWB signal before transmission across any communication link within a piconet. The spreading code may be viewed as being a Walsh-Hadamard code or a PN (Pseudo-Noise) code that is a sequence of +1 and −1; however, the PN code of the invention also includes strategically placed zeroes (0s) that are operable to null one or more portions of the UWB spectrum. These nulled portions of the UWB signal's spectrum, as provided by the strategically placed zeroes (0s) of the PN code, may be viewed as narrowband blocking intervals. While a portion of information may be lost, in that a portion of the available spectrum is nulled, the loss is significantly less than what would be experienced due to the interference by the one or more narrowband interferers.

As shown in this particular diagram, 3 separate narrowband blocking intervals generated by strategically placed zeroes (0s) in the PN code effectively null the UWB signal in these regions. This allows for the narrowband interference to be substantially eliminated. Within several of the various embodiments described herein, it is noted that the frequencies around which the one or more narrowband interferers are located may be predetermined (e.g., known beforehand) and/or assessed in real time. For example, one embodiment may have some information corresponding to known narrowband interferers and also perform interference assessment to identify any other narrowband interferers as well. Moreover, the strategic placement of the these narrowband blocking intervals may be performed based on the locations of other devices and/or other communication systems located in relative close proximity to the communication system in question. For example, a first narrowband interferer may be located relatively closer to the piconet in question that a second narrowband interferer; in such a case, the narrowband blocking interval may more appropriately be placed to deal primarily with the interference generated by the first narrowband interferer.

As such, several PN codes may be identified beforehand and the appropriate PN code may be assigned to support communication across a communication link based on this information. The assignment of the PN code, from among a plurality of possible PN codes, may be made based on the location of the narrowband interferers, the positions of the devices, and/or a combination of both the location of the narrowband interferers and the positions of the devices within a piconet. This assignment of the PN code may also be made based on the location of other communication systems operating in such a way that they interfere with the UWB signals transmitted within the piconet in question. Moreover, the PN code assignment may be made on a device specific basis (to individual communication links between devices within the piconet), on a zone basis (to communication links between devices within various regions within the piconet), and/or even on a piconet basis (assigning PN codes to communication links within one piconet that are different to the PN codes assigned to communication links within another piconet). Several of the possible various ways in which such PN code assignment may be performed are described in more detail below.

Figure 6:
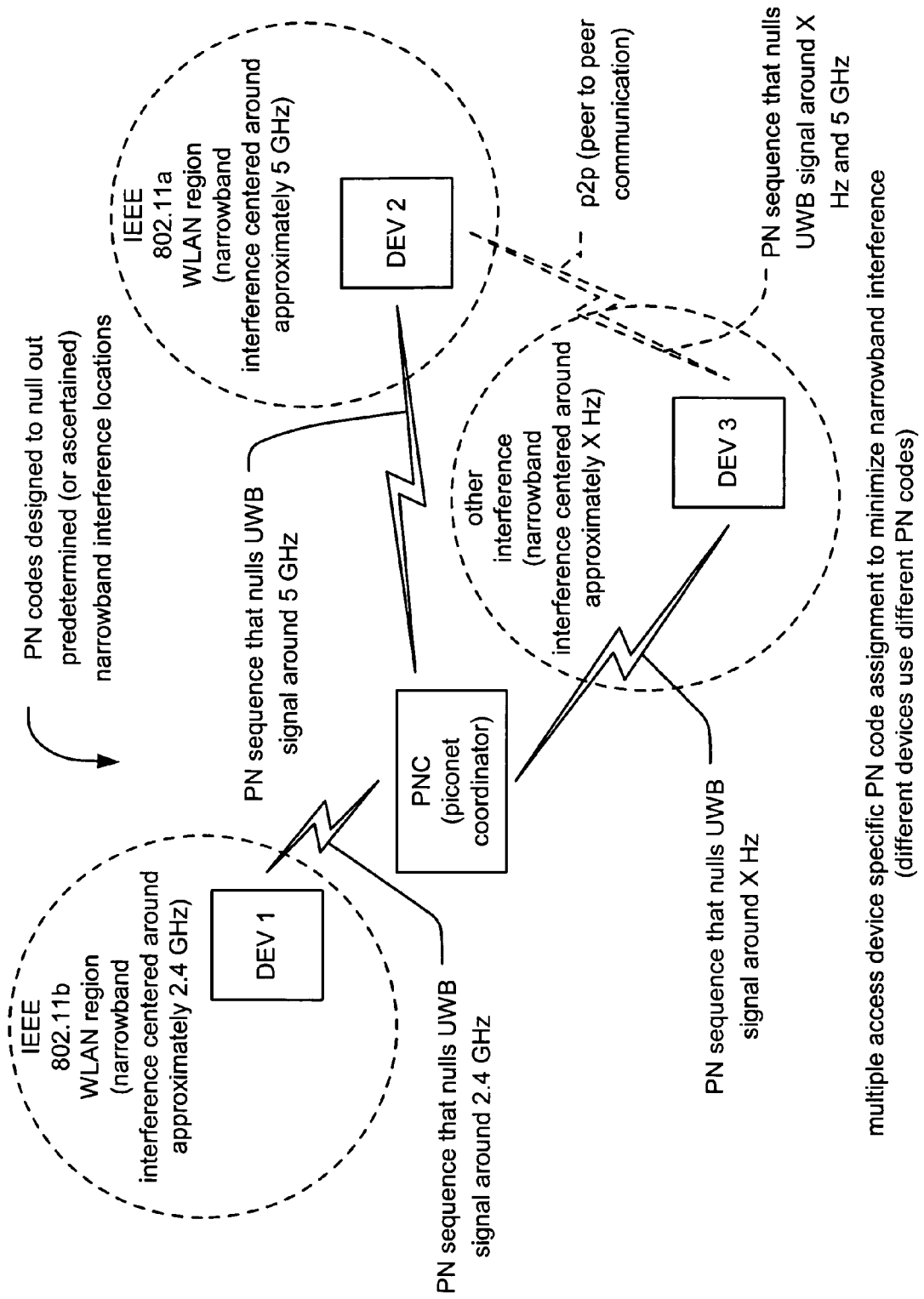
FIG. 6 is a diagram illustrating an embodiment of multiple access device specific PN code assignment to minimize narrowband interference according to the invention (showing different devices using different PN codes).

FIG. 6 is a diagram illustrating an embodiment of multiple access device specific PN code assignment to minimize narrowband interference according to the invention (showing different devices using different PN codes). This embodiment shows a single piconet having a PNC (piconet coordinator) and several DEVs (shown as a DEV 1, a DEV 2, and a DEV 3). Appropriately assigned PN codes are employed to support the communication across the various communication links between the PNC and the various DEVs. In addition, an appropriately assigned PN code may be employed to support the communication across a communication link between 2 separate DEVs that operate in a p2p (peer to peer) manner; the PNC may be employed to set up the p2p communication between the 2 DEVs.

The various PN codes include PN sequences that include strategically placed zeroes (0s) that are operable to effectively null portions of the UWB spectrum as to substantially eliminate the narrowband interference therein. For example, the DEV 1 operates within a region having interference generated by an IEEE (Institute of Electrical & Electronics Engineers) 802.11b WLAN (Wireless Local Area Network); therefore, the interference of the communication link between the DEV 1 and the PNC is substantially centered around approximately 2.4 GHz (Giga-Hertz). Therefore, the PN code that supports communication across the communication link between the DEV 1 and the PNC includes a PN sequence that substantially nulls the UWB signal around approximately 2.4 GHz.

Similarly, the DEV 2 operates within a region having interference generated by an IEEE 802.11a WLAN; therefore, the interference of the communication link between the DEV 2 and the PNC is substantially centered around approximately 5 GHz. Therefore, the PN code that supports communication across the communication link between the DEV 2 and the PNC includes a PN sequence that substantially nulls the UWB signal around approximately 5 GHz.

In general, a PN code may be employed that effectively nulls the UWB signal around any frequency of concern within the UWB signal space. For example, the DEV 3 may operate within a region having interference that is substantially centered around a approximately X Hz. Therefore, the interference of the communication link between the DEV 3 and the PNC is substantially centered around approximately X Hz. Therefore, the PN code that supports communication between the DEV 3 and the PNC includes a PN sequence that substantially nulls the UWB signal around approximately XHz.

The intelligent assignment of PN codes across any of the various communication links may also null more than one portion of the spectrum of the UWB signal. As an example, the p2p communication link between the DEVs 2 & 3 will experience interference substantially centered around both 5 GHz and X Hz. Therefore, the PN code that supports p2p communication between the DEVs 2 & 3 includes a PN sequence that substantially nulls the UWB signal around approximately X Hz as well as around approximately 5 GHz.

This principle of nulling multiple portions of the UWB spectrum may also be employed across any of the communication links between any one of the DEVs and the PNC without departing from the scope and spirit of the invention. Moreover, this embodiment shows how different PN codes may be selectively assigned to the communication links between individual devices within the piconet.

Figure 7:
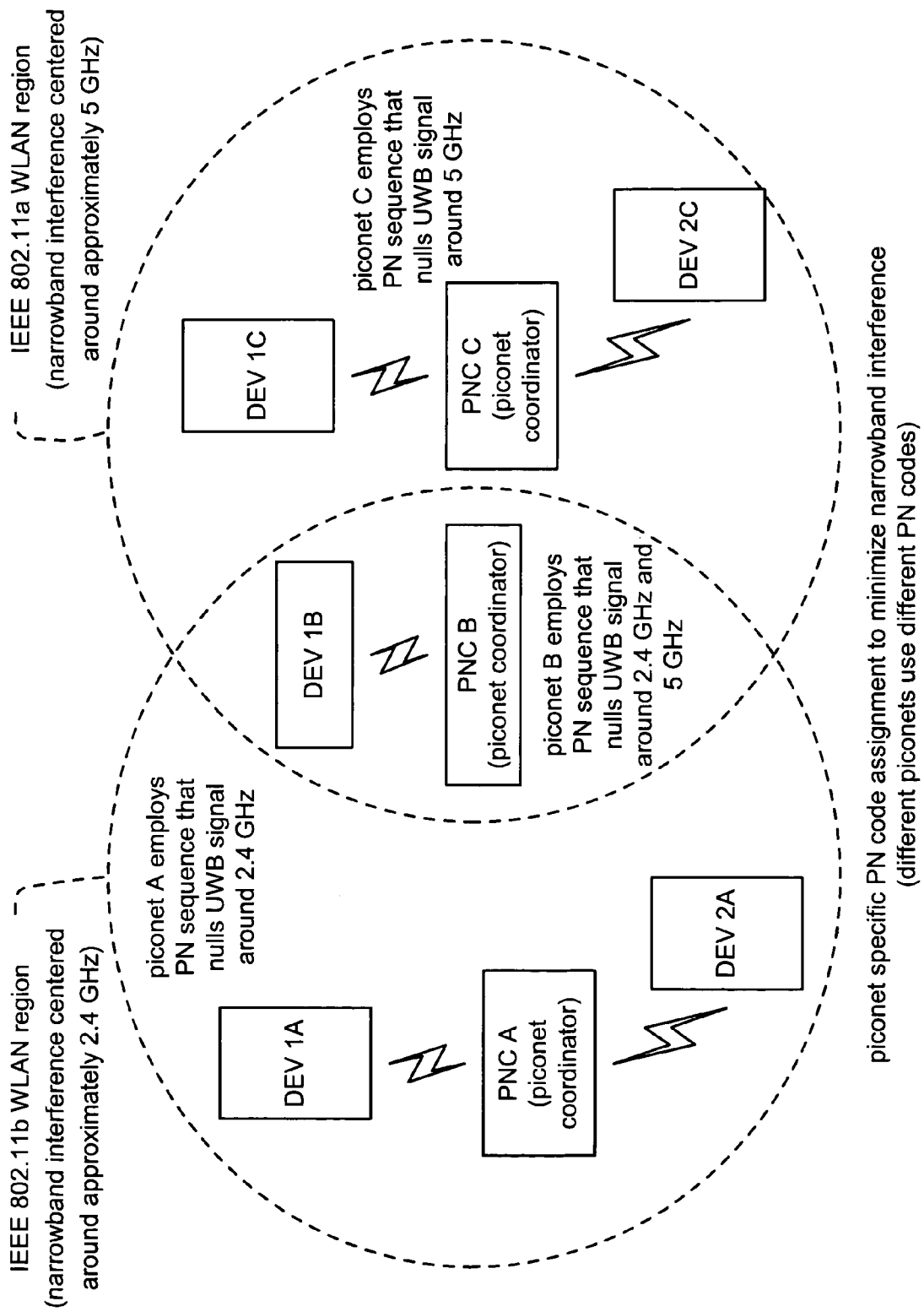
FIG. 7 is a diagram illustrating an embodiment of piconet specific PN code assignment to minimize narrowband interference according to the invention (showing different piconets using different PN codes).

FIG. 7 is a diagram illustrating an embodiment of piconet specific PN code assignment to minimize narrowband interference according to the invention (showing different piconets using different PN codes). This embodiment shows how the assignment of PN codes may be made for various piconet based on the particular interference experienced within them. For example, a piconet A includes a PNC A and DEVs 1A & 2A. The piconet A operates within a region such that it experiences interference generated by an IEEE 802.11b WLAN; this interference is substantially centered around approximately 2.4 GHz. Therefore, the PN codes that are selected to support the communication between the PNC A and DEVs 1A & 2A substantially null the UWB signals communicated between them around approximately 2.4 GHz.

Similarly, a piconet C includes a PNC C and DEVs 1C & 2C. The piconet C operates within a region such that it experiences interference generated by an IEEE 802.11a WLAN; this interference is substantially centered around approximately 5 GHz. Therefore, the PN codes that are selected to support the communication between the PNC A and DEVs 1C & 2C substantially null the UWB signals communicated between them around approximately 5 GHz.

In addition, a piconet B includes a PNC B and a DEV 1B. The piconet B operates within a region such that it experiences interference generated by both the IEEE 802.11a WLAN and the IEEE 802.11b WLAN; this interference is substantially centered around approximately 5 GHz as well as around approximately 2.4 GHz. Therefore, the PN codes that are selected to support the communication between the PNC B and DEV 1B substantially null the UWB signals communicated between them around approximately 5 GHz as well as around approximately 2.4 GHz.

It is noted that the locations of the IEEE 802.11a WLAN and the IEEE 802.11b WLAN may be known beforehand, or the interference generated thereby may be determined in real time when performing interference assessment. Depending on the relative proximity of the various WLANs, appropriately selected PN codes may be employed such they deal primarily with the interferer causing the majority of the interference. For example, the PN codes employed within the piconet B may more effectively null the portion of the UWB signal around approximately 5 GHz when the interference generated by the IEEE 802.11a WLAN is substantially more than the interference generated by the IEEE 802.11b WLAN (which is centered around approximately 2.4 GHz).

Figure 8:
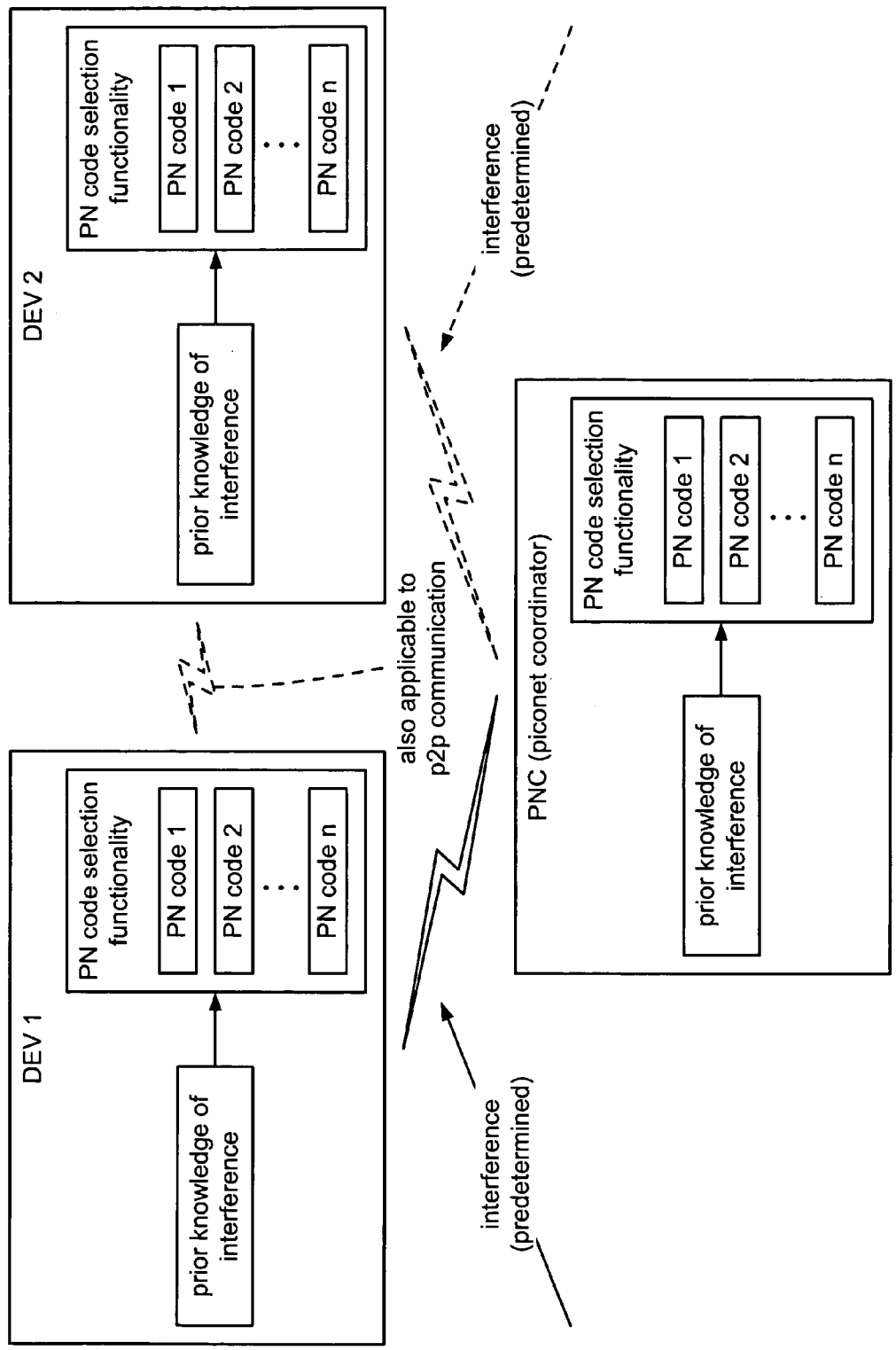
FIG. 8 is a diagram illustrating an embodiment of a piconet performing PN code assignment using prior knowledge of interference according to the invention.

FIG. 8 is a diagram illustrating an embodiment of a piconet performing PN code assignment using prior knowledge of interference according to the invention. A piconet includes a PNC and 2 DEVs (shown as a DEV 1 and a DEV 2). Each of the devices within the piconet includes a plurality of PN codes (shown as a PN code 1, a PN code 2, . . . , and a PN code n).

Each of these PN codes is appropriately designed to perform nulling of at least one portion of the UWB spectrum used to generate UWB signals transmitted between the various devices of the piconet. For example, each of the various PN code may be designed to substantially null at least one portion of the UWB spectrum. The PN code 1 may be designed to substantially null a first portion of the UWB spectrum centered around a frequency 1. The PN code 2 may be designed to substantially null a second portion of the UWB spectrum centered around a frequency 2. The PN code 3 may be designed to substantially null both the first portion and the second of the UWB spectrum centered around the frequency 1 and the frequency 2. Similarly, other of the PN codes may be appropriately designed to null other portions of the UWB spectrum.

Within this embodiment, the devices within the piconet have information corresponding to prior knowledge of interference. That is to say, this prior knowledge of the interference includes knowledge about the center frequency around which such narrowband interference is centered. In some embodiments, one of the devices within the piconet (e.g., the PNC) has such prior knowledge of the interference, and that device transmits the prior knowledge of the interference to the other devices within the piconet. In other embodiments, each of the devices includes the prior knowledge of the interference.

Then, based on this prior knowledge of the interference, the appropriate PN code is assigned to support the communication via the communication links between the various devices of the piconet. The assigned PN code for each communication link will then operate to null the narrowband interference of the UWB spectrum employed across that communication link. This is also applicable to any p2p communication between DEVs within the piconet.

It is also noted here that this prior knowledge of interference may also include prior knowledge of the locations of the sources of interference as well as the frequencies around which the interference is centered. For example, there may be prior knowledge of the existence of a known interferer as well as prior knowledge of the location of the known interferer with respect to the piconet.

Figure 9:
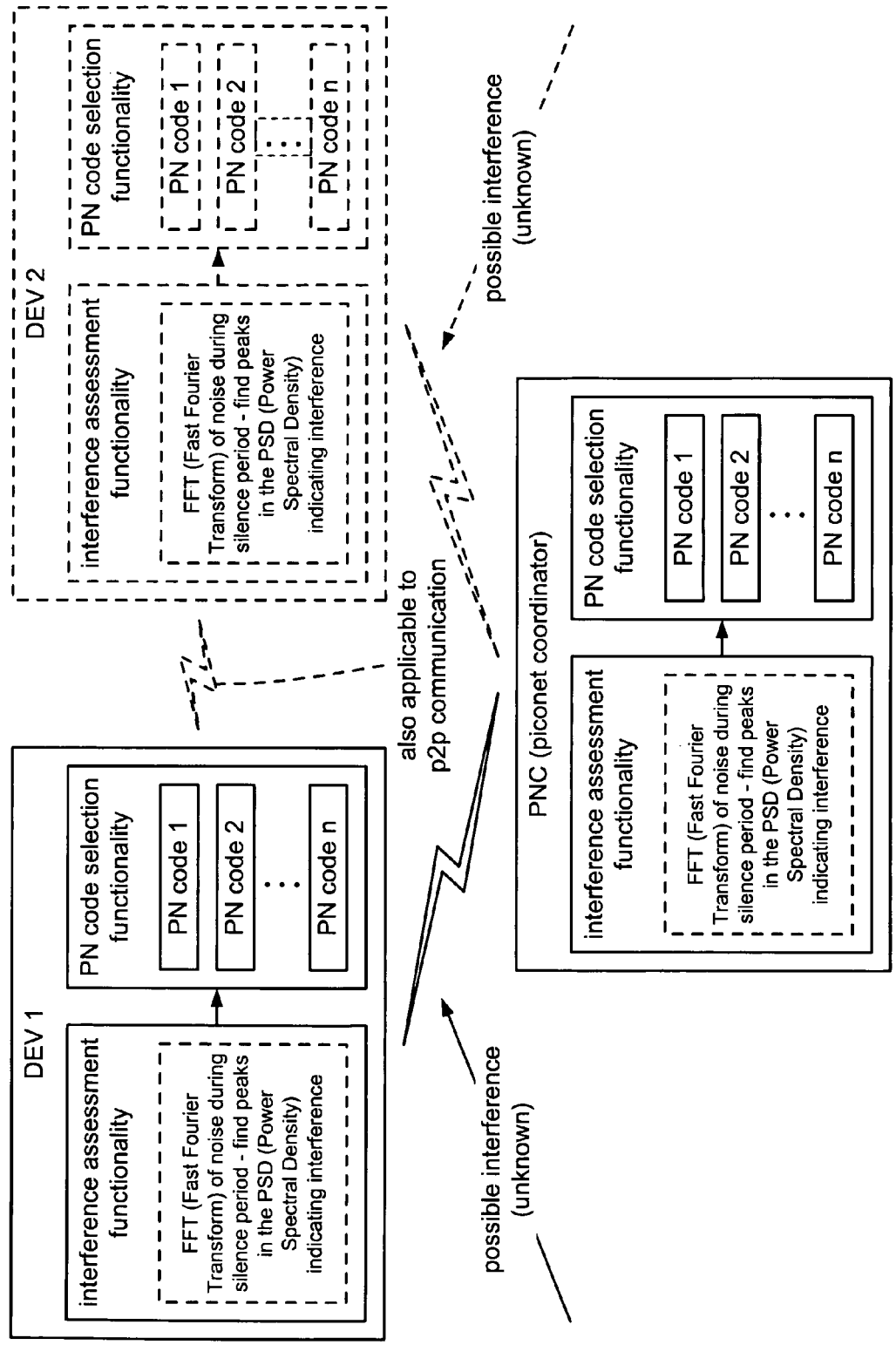
FIG. 9 is a diagram illustrating an embodiment of a piconet performing PN code assignment using interference assessment according to the invention.

FIG. 9 is a diagram illustrating an embodiment of a piconet performing PN code assignment using interference assessment according to the invention. This embodiment also includes a piconet that includes a PNC and 2 DEVs (shown as a DEV 1 and a DEV 2). Each of the devices within the piconet includes a plurality of PN codes (shown as a PN code 1, a PN code 2, . . . , and a PN code n).

At least one of the devices within the piconet includes interference assessment functionality that is operable to identify the existence of narrowband interference within the UWB spectrum and also to identify the frequency around which the interference is substantially centered. This interference assessment may be performed in real time; it may be performed after the elapse of every predetermined period of time (e.g., successively every n seconds, where n is programmable). To perform the interference assessment, the PNC may direct all of the devices within the piconet to operate in a silence mode for a predetermined period of time, then the interference functionality performs an FFT (Fast Fourier Transform) of the noise that is monitored during the silence period. Then, analyzing the PSD (Power Spectral Density) that is generated by the FFT of the noise, peaks within the PSD are identified thereby indicating the existence of the interference and also identifying the frequency around which the interference is substantially centered.

It is also noted that the other devices within the piconet (e.g., the DEVs) may also operate cooperatively with the PNC to perform the interference assessment using interference assessment functionality contained within those devices; communication of such assessed interference may then be communicated between the various devices thereby informing all of the devices within the piconet of any interference experienced by the piconet. Any other means that may be performed to identify the existence of the interference as well as to identify the frequency around which the interference is substantially centered may also be performed without departing from the scope and spirit of the invention.

Using this information corresponding to the interference that has been assessed, the appropriate PN codes may be assigned to support communication across the various communication links between the various devices within the piconet. For example, the communication link between the PNC and the DEV 1 may be governed according to the PN code 1. The communication link between the PNC and the DEV 2 may be governed according to the PN code 2. The p2p communication link between the DEV 1 and the DEV 2 may be governed according to the PN code 2.

Figure 10:
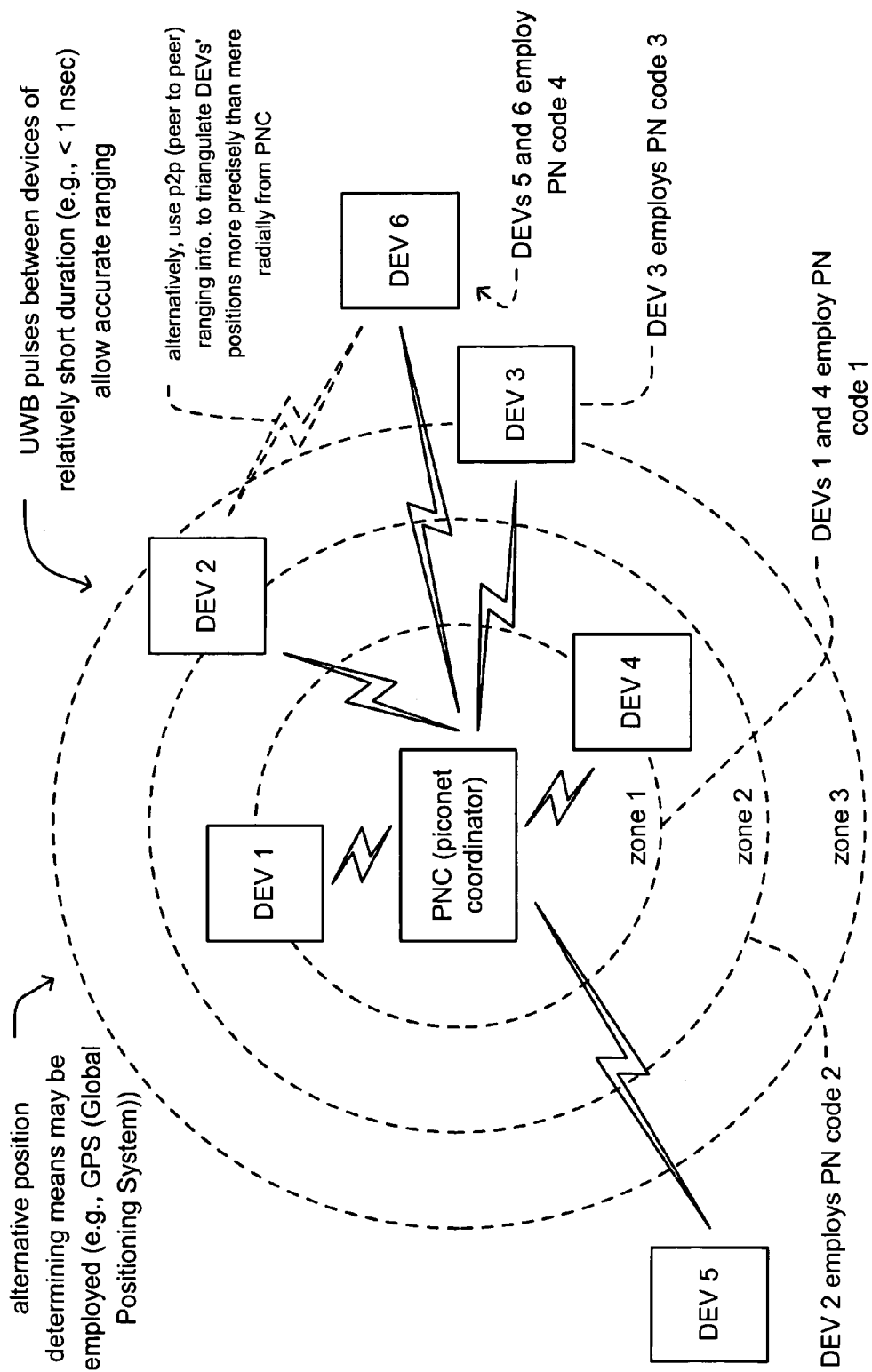
FIG. 10 is a diagram illustrating an embodiment of position determination of devices in a piconet according to the invention (shown in a radial embodiment).

FIG. 10 is a diagram illustrating an embodiment of position determination of devices in a piconet according to the invention (shown in a radial embodiment). This embodiment shows how the relative distances between various DEVs and a PNC may be used to selectively assign appropriate PN codes to the various communication links between the various devices.

The distance determination made in this embodiment shown as being performed strictly radially as emanating from the location of the PNC to each of the DEVs. For each DEV having a portion that may be reached (more specifically, having a portion able to support wireless communication) within a zone 1, these DEVs may all be grouped within a group 1. In this particular embodiment, these DEVs are DEV 1 and DEV 4. Communication between these DEVs 1 & 4 and the PNC is supported according to a PN code 1.

Continuing on the grouping of DEVs within this embodiment, a DEV 2 is grouped into a zone 2. Communication between this DEV 2 and the PNC is supported according to a PN code 2. Continuing on the grouping of DEVs within this embodiment, A DEV 3 is grouped into a zone 3. Communication between this DEV 3 and the PNC is supported according to a PN code 3. Continuing on the grouping of DEVs within this embodiment, DEVs 5 & 6 are grouped into a group that is beyond or outside of the reach of the zone 3. Communication between these DEVs 5 & 6 and the PNC is supported according to a PN code 4.

Moreover, a selected and assigned PN code, selected from a plurality of possible PN codes, may also be employed to support p2p (peer to peer) communication between the DEVs within the communication system.

Again, as shown in this embodiment, the grouping of the DEVs into the various groups is performed based on the radial distances emanating from the PNC in ever increasing circles (with respect to 2 dimensions) or ever increasing spheres (with respect to 3 dimensions). To determine these relative distances between the PNC and the DEVs, the PNC transmits UWB (Ultra Wide Band) pulses to each of the DEVs. After each corresponding DEV receives its respective UWB pulse, that DEV transmits another UWB pulse back to the PNC. The PNC performs ranging of the relative position of each DEV using the time duration of a round trip of the transmitted UWB pulse and the received UWB pulse thereby determining the relative distance between the PNC and each DEV. This may be performed borrowing on the relatively short duration of UWB pulses (e.g., typically less than 1 nsec (nano-sec) in duration). These UWB pulses will typically therefore travel at a velocity of approximately 1 nsec/ft (1 nano-sec per foot). This allows the PNC to resolve signals to within approximately 1 nsec time intervals thereby providing a relatively precise determination of the relative locations of the DEVs with respect to the PNC.

In addition, other embodiments may use alternative means to determine position information of the various devices such as GPS (Global Positioning System) functionality included within the various devices and/or triangulation that includes at least 3 devices (e.g., the PNC and 2 DEVs). Such alternative embodiments are also referred to and described in more detail below. Appropriate PN codes may be assigned to support communication across the various communication links using their determined position information in conjunction with predetermined knowledge of the interference within those communication links and/or assessed information of such interference that may be performed in real time. Moreover, the invention may accommodate changes in the locations of the interference and/or changes in the positions of the devices within the PN. New or different PN codes may then be re-assigned to accommodate such changes in the interference and/or positions of the devices to continue to provide substantial elimination of the interference across the appropriate communication links between the devices.

FIG. 11A is a diagram illustrating an embodiment of position determination of devices in a piconet according to the invention (shown using triangulation). This embodiment shows how triangulation may be employed using the ranging performed by p2p (peer to peer) communication between the various DEVs as well as the ranging performed between the PNC and the DEVs. In knowing the relative distances between 3 different devices, it is known that their relative location with respect to one another can be determined with a high degree of accuracy.

For example, p2p ranging between a DEV 1 and a DEV 2 as well as the ranging information between the PNC and the DEV 1 and the DEV 2 may all be employed to determine the specific location of these devices within the region with respect to one another. The PNC may perform the ranging itself between the DEV 1 and the DEV 2, and the PNC may direct one or both of the DEV 1 and the DEV 2 to perform p2p ranging between themselves. Then, one or both of the DEV 1 and the DEV 2 may communicate this ranging information back to the PNC so that the PNC may perform triangulation to determine the specific locations of the 3 devices with respect to one another. This way, a more precise grouping of the DEVs may be performed. Alternatively, an appropriate PN code may be assigned for the communication links between each and every DEV that may be serviced by the PNC. Triangulation may similarly be performed using the PNC and the DEVs 2 & 3.

Alternatively, each of the devices may contain GPS functionality that is able to discern the absolute location of the device on the earth within a particular precision as provide by the GPS functionality employed. This information may be transmitted between the various devices allowing for appropriate grouping and selecting of PN codes to govern the communication to and from those devices. GPS technology has matured significantly over the recent years, and it is possible to include such location determining functionality within the various devices relatively easily.

In any of the embodiments that perform ranging, triangulation, or GPS position determination, this position determination may be performed every so often as desired by a particular designer. For example, a predetermined time period may be selected, and the position determination may be performed after every elapse of this predetermined time period. More specifically, one or more of the GPS capable DEV may be instructed to transmit its location to the PNC every n seconds (or minutes, or whatever time period is selected). Similarly, the ranging operation may be performed for one or more of the devices after every predetermined period of time has elapsed. Using this approach, dynamic changes in the relative positions of the devices with respect to one another may be ascertained every so often. This way, the grouping of the devices and/or selection of the appropriate PN codes may be updated as needed to accommodate changes in the positions of the devices to ensure efficient operation of the overall system in reaction to any changes of position therein.

FIG. 11B is a diagram illustrating an embodiment of position determination of devices in a piconet according to the invention (shown accommodating changes in positions). This embodiment shows how a PN code 1 is employed to support the communication between a PNC and a DEV at a time 1. Then, later, at a time 2, the DEV has changed position with respect to the PNC. A PN code 2 is then selected to govern the communication between the PNC and a DEV at the time 2. The PN codes 1 & 2 may be completely different, or they may be different as required to substantially null any narrowband interference within the communication links between the respective devices. This embodiment shows how changes in position of the devices and/or changes in the interference within the communication links between the devices may be employed to re-assign different PN codes to substantially null any narrowband interference within the communication links between the respective devices.

Figure 12:
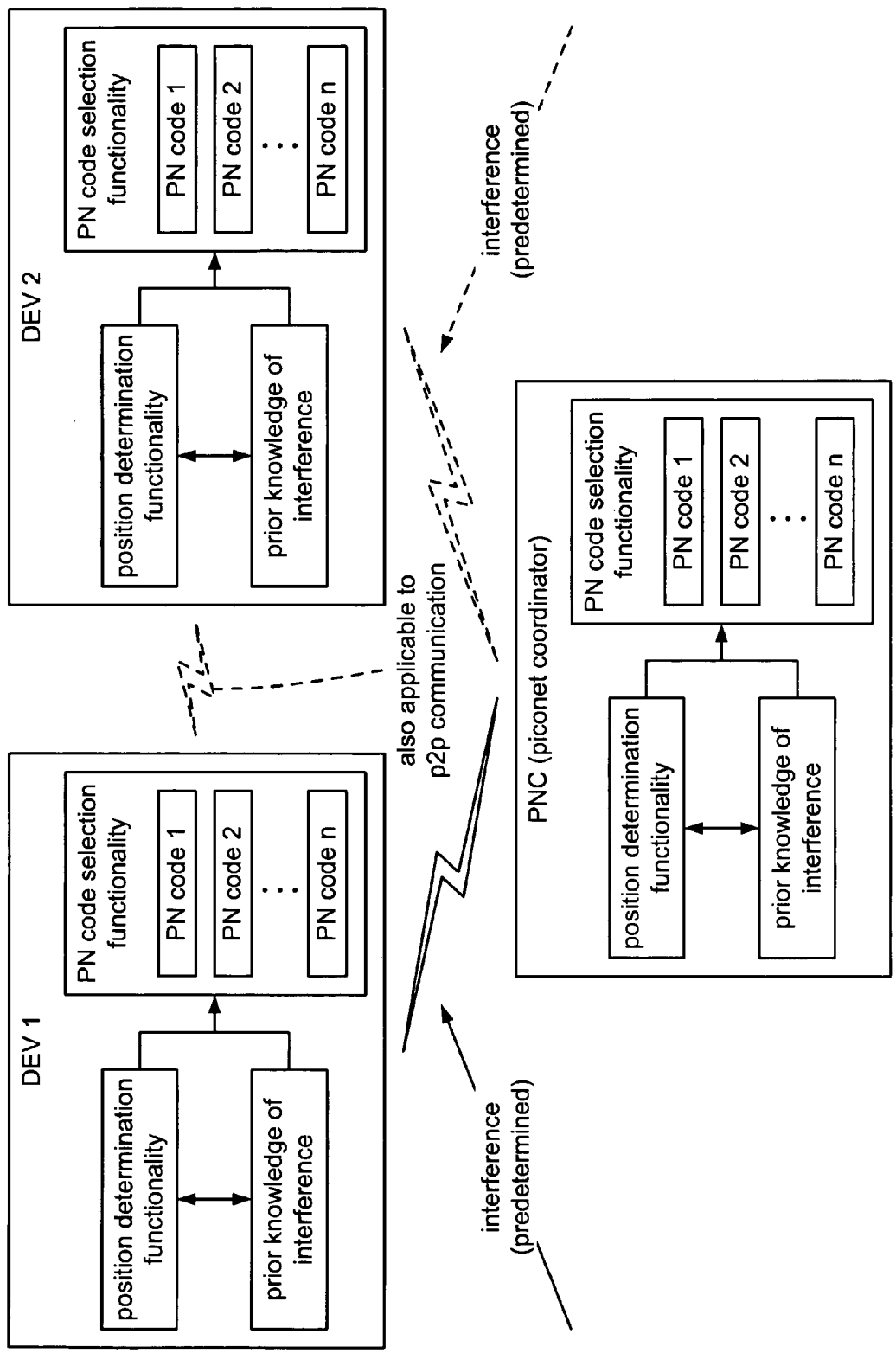
FIG. 12 is a diagram illustrating an embodiment of a piconet performing PN code assignment using prior knowledge of interference and position determination according to the invention.

FIG. 12 is a diagram illustrating an embodiment of a piconet performing PN code assignment using prior knowledge of interference and position determination according to the invention. Somewhat similar to the embodiment described above with respect to the FIG. 9 in which a piconet performs PN code assignment using interference assessment according to the invention, this embodiment combines interference assessment in conjunction with position determination to perform more intelligent assignment of the PN codes that are used to govern the communication across the communication links between the various devices within the piconet. The position determination is performed to identify the locations of the various devices within the piconet. It is also noted that the position determination functionality may also perform position determination of adjacent communication systems such as IEEE 802.11 WLANs and other wireless communication systems.

Using information corresponding to the locations of the devices within the piconet as well as information corresponding to the existence (as well as a the frequency around which the interference is substantially centered, when interference is detected and identified) PN codes are appropriately assigned to govern the communication across the various communication links within the piconet between the various devices; this is also applicable to any p2p communication between DEVs within the piconet.

Using the information corresponding to the positions of the various devices within the piconet, as well as information corresponding to any adjacent wireless communication systems that may be sources of interference, PN codes are then assigned to govern the communication across the communication links that communicatively couple the various devices and ensuring that the interference contained therein is nulled and thereby substantially eliminated.

Figure 13:
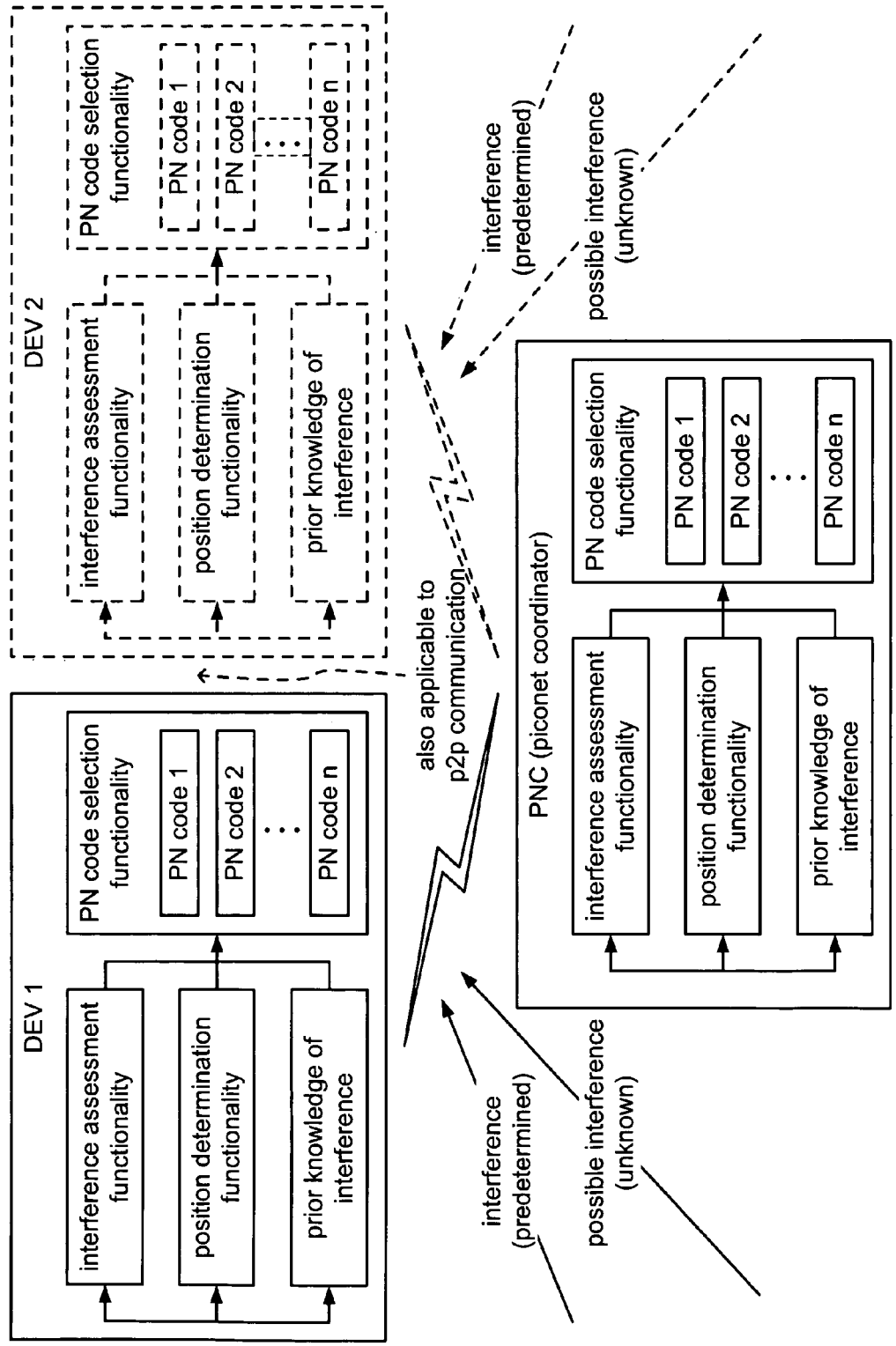
FIG. 13 is a diagram illustrating an embodiment of a piconet performing PN code assignment using prior knowledge of interference, position determination, and interference assessment according to the invention.

FIG. 13 is a diagram illustrating an embodiment of a piconet performing PN code assignment using prior knowledge of interference, position determination, and interference assessment according to the invention. This embodiment combines the three aspects of prior knowledge of interference, position determination, and interference assessment to assist in the assignment of the appropriate PN codes to support the communication between the various communication links within the piconet.

Prior knowledge of any interferers may be employed in conjunction with any assessed interferes such that any necessary modification or updating may be performed to ensure that the PN codes currently being employed are appropriate at any given time. As an example, the prior knowledge of interference may include information about the existence of a known interferer (e.g., an IEEE 802.11 WLAN) that may also include the frequency around which the narrowband interference is centered as well as prior knowledge information corresponding to the location of the region in which that interferer operates.

The interference assessment functionality may then operate to identify the existence of another interferer (that was previously unknown). The position determination information may then operate to determine the locations of the various devices within the piconet. Using all of this available information, the appropriate PN codes may then be selected to support the communication via the various communication links within the piconet. This embodiment shows how the invention is operable to perform PN code assignments using a variety of different types of information.

FIG. 14A is a diagram illustrating an embodiment of dynamic re-assignment of PN codes within a piconet according to the invention (shown using a finite set of PN codes stored within devices). This embodiment shows how a number of devices within a piconet may all include a finite set of PN codes stored therein. For example, a PNC may include information corresponding to a PN code 1, a PN code 2, . . . , and a PN code n. Similarly, each of the DEVs within the communication system may also include information corresponding to the PN code 1, the PN code 2, . . . , and the PN code n. This way, when communication is to be supported between any 2 of these devices, both of the devices will have information corresponding to the appropriate PN code so that they may communicate effectively (e.g., nulling the same portions of the UWB spectrum when transmitting a signal and expecting the same portions of the UWB spectrum to be nulled when receiving a signal).

As an example, the PNC may communicate with the DEV 1 such that both the PNC and the DEV 1 both employ the PN code 2. Analogously, the PNC may communicate with the DEV 2 such that both the PNC and the DEV 2 both employ the PN code n. Also analogously, the PNC may direct the DEV 1 and the DEV 2 to perform p2p communication between them such that both the DEV 1 and the DEV 2 both employ the PN code 1 in their p2p communication. By providing the information corresponding to the PN codes to each of the devices, they may all be able to support effective communication between themselves.

Having this finite set of PN codes stored within the devices, the different PN code from among this finite set of PN codes may be re-assigned when the operating conditions of a particular communication link change. This re-assignment may be performed in real time (e.g., during a time between frames that are transmitted via the communication link) so that subsequent communications (performed after the re-assignment to a different PN code that more appropriately nulls the interference across that communication link after the change in operating conditions) may be performed more effectively.

FIG. 14B is a diagram illustrating an embodiment of dynamic re-assignment of PN codes for multiple devices as a function of time according to the invention. The dynamic re-assignment shown here is shown at two different times (e.g., a time 1 and a time 2). This dynamic re-assignment may be viewed as being performed within a communication system supporting simultaneous multiple access for a plurality of devices.

At the time 1, three different devices are shown as each having a corresponding PN code assigned thereto. A device 1 employs a PN code 1 to perform spreading of signals to be transmitted there from. Similarly, at the time 1, a device 2 employs a PN code 2 to perform spreading of signals to be transmitted there from, and device 3 employs a PN code 3 to perform spreading of signals to be transmitted there from.

Then, after performing dynamic re-assignment of the PN codes assigned to the various devices, at a time 2, the device 1 now employs the PN code 2 to perform spreading of signals to be transmitted there from. Similarly, at the time 2, the device 2 now employs the PN code 3 to perform spreading of signals to be transmitted there from, and device 3 now employs the PN code 1 to perform spreading of signals to be transmitted there from.

It is noted that the dynamic re-assignment of PN codes described above may also be performed within the other various embodiments described herein including those embodiments that perform PN code assignment based on prior knowledge of interference (that may include knowledge of the locations of the sources of interference as well as the frequencies around which the interference is centered), position determination, and/or interference assessment. Moreover, where appropriate, dynamic re-assignment of one or more PN codes may be performed for multiple piconets as well without departing from the scope and spirit of the invention; for example, the PN code assignments within 2 or more piconets may be modified based on changes in operating conditions of one or both of the piconets such as changes in the interference and/or changes in the positions of the devices in one or both of the piconets.

Figure 15:
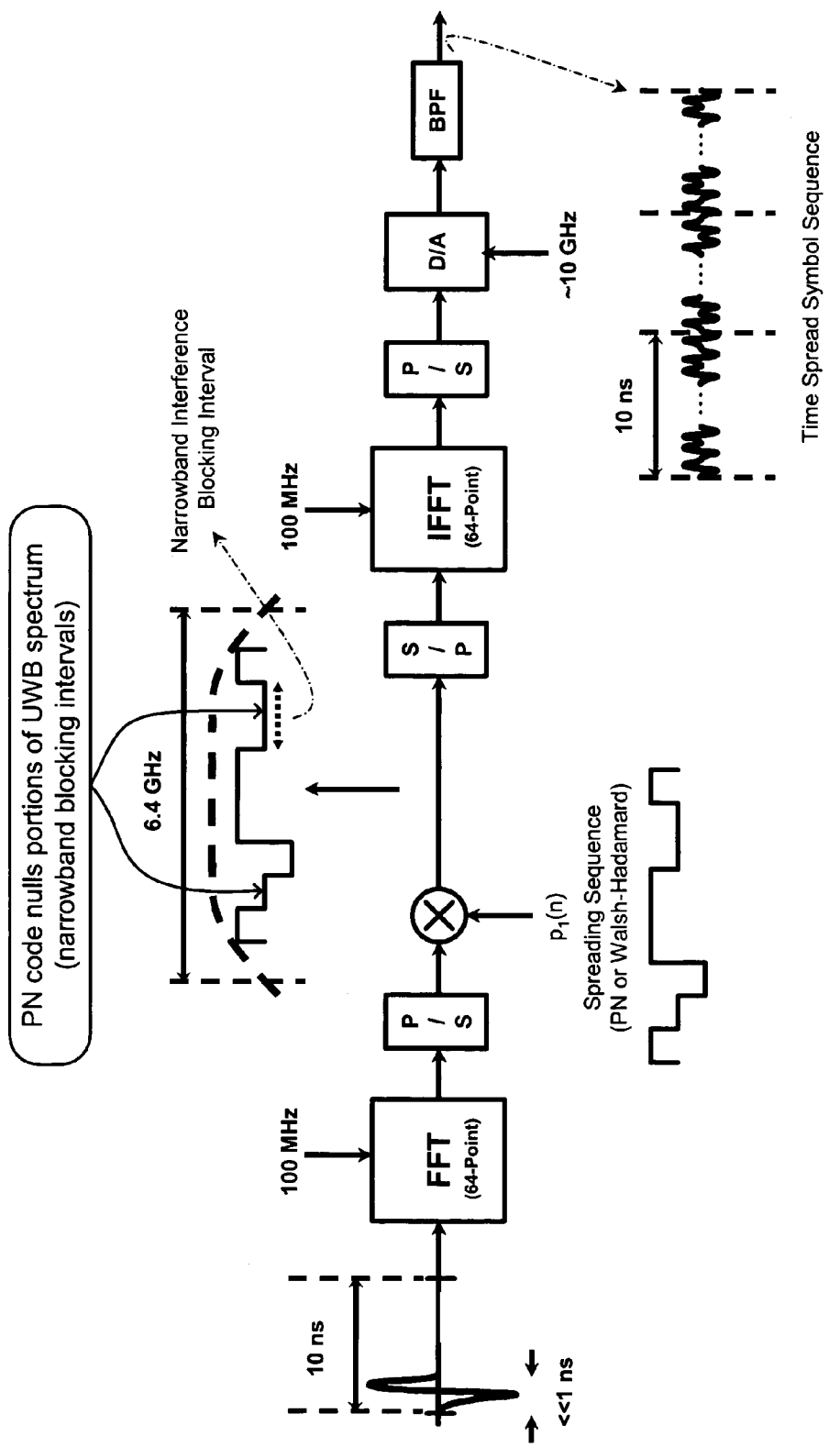
FIG. 15 is a diagram illustrating an embodiment of UWB (Ultra Wide Band) waveform design using DSSS (Direct Sequence Spread Spectrum) according to the invention.

FIG. 15 is a diagram illustrating an embodiment of UWB (Ultra Wide Band) waveform design using DSSS (Direct Sequence Spread Spectrum) according to the invention. Within this embodiment, an FFT (Fast Fourier Transform) is performed on a UWB data pulse that converts the signal into a set of coefficients of orthogonal waveforms. In one embodiment, the FFT is performed using 64 points at an operational frequency of approximately 100 MHz (Mega-Hertz). The UWB data pulse has duration of approximately 10 ns (nanoseconds) in one embodiment.

These orthogonal waveforms are then provided to a P/S (Parallel to Serial) converter to generate a single signal that is then spread using a spreading sequence, $p_1(n)$. This spreading sequence may be viewed as being a Walsh-Hadamard code or a PN (Pseudo-Noise) code. This PN code nulls portions of the UWB spectrum employed to transmit the UWB pulse across a communication channel. As also described within other embodiments above, those nulled portions of the UWB spectrum may be viewed as being narrowband blocking intervals.

At the receiver end of a communication channel, a S/P (Serial to Parallel) converter transforms the received serial signal into a set of coefficients of orthogonal waveforms on which an IFFT (Inverse Fast Fourier Transform) is performed. In one embodiment, the IFFT is performed using 64 points at an operational frequency of approximately 100 MHz. The output of the IFFT functional block is then provided again to another P/S (Parallel to Serial) converter that converts the results of the IFFT to a serial signal again, and this output signal is provided to a D/A (Digital to Analog Converter). In one embodiment, this D/A operates at an operational frequency of approximately 10 GHz. The now analog signal is then provided to a BPF (Band Pass Filter) that outputs a time spread symbol sequence that is representative of the estimates of the UWB pulses that are originally provided at the transmitter end of the communication channel.

Figure 16:
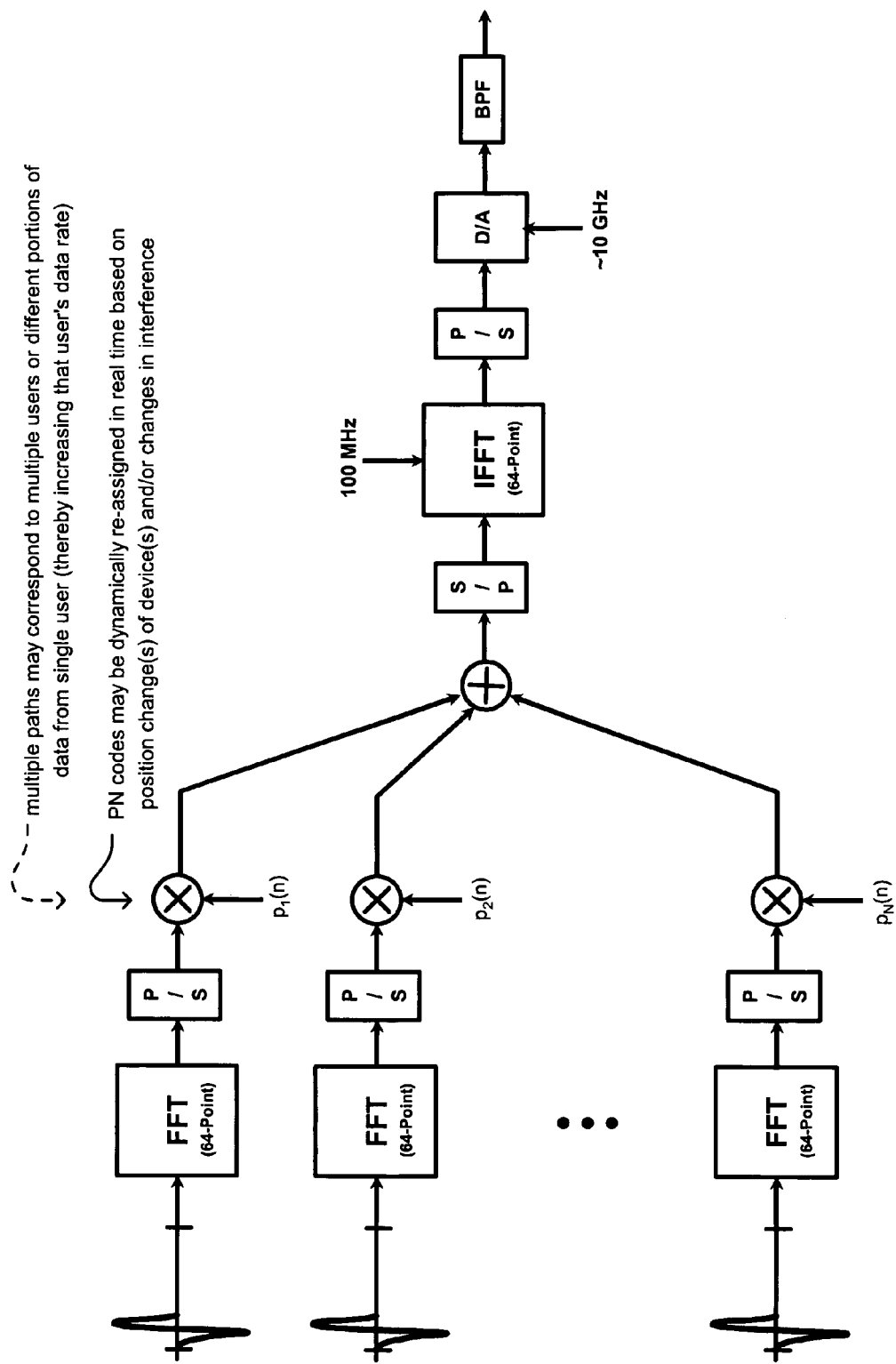
FIG. 16 is a diagram illustrating an embodiment of UWB (Ultra Wide Band) waveform design using CDMA (Code Division Multiple Access) according to the invention.

FIG. 16 is a diagram illustrating an embodiment of UWB (Ultra Wide Band) waveform design using CDMA (Code Division Multiple Access) according to the invention. This embodiment shows an example of how simultaneous access may be provided to a number of devices using the approach described herein to perform nulling of at least one portion of a UWB spectrum. Respective UWB pulses, contained data corresponding to the various devices within the CDMA communication system, are provided to FFT converters. The FFTs performed on the UWB data pulses convert the respective signals into sets of coefficients of orthogonal waveforms. In one embodiment, the FFTs are performed using 64 points at operational frequencies of approximately 100 MHz. Also, the UWB data pulse may have duration of approximately 10 ns in one embodiment.

For each of these various devices that are provided simultaneous access using CDMA, these orthogonal waveforms are then provided to P/S (Parallel to Serial) converters to generate the single signals that are then spread using spreading sequences, $p_1(n)$, $p_2(n)$, ..., and $p_N(n)$, respectively. Again, these spreading sequences may be viewed as being Walsh-Hadamard codes or a PN codes. For each of the devices, the corresponding PN code nulls portions of the UWB spectrum employed to transmit the UWB pulse across a communication channel. Each of the PN codes may be specifically tailored for the path by which a particular device accesses the communication system using CDMA, and the re-assignment of the PN codes may be performed dynamically thereby changing the PN code assignments of the various devices. As also described within other embodiments above, those nulled portions of the UWB spectrum may be viewed as being narrowband blocking intervals. Moreover, each of the multiple data paths each undergoes spreading using its corresponding spreading sequence (e.g., path 1 is spread using spreading sequence $p_1(n)$, path 2 is spread using spreading sequence $p_2(n)$, and so on). These multiple paths may correspond to different users, or they may correspond to different portions of data from a single user (thereby increasing that user's data rate).

The receiver end of the communication channel is very similar to the embodiment described just above with respect to DSSS. At the receiver end of a communication channel, a S/P (Serial to Parallel) converter transforms the received serial signal into a set of coefficients of orthogonal waveforms on which an IFFT (Inverse Fast Fourier Transform) is performed. In one embodiment, the IFFT is performed using 64 points at an operational frequency of approximately 100 MHz. The output of the IFFT functional block is then provided again to another P/S (Parallel to Serial) converter that converts the results of the IFFT to a serial signal again, and this output signal is provided to a D/A (Digital to Analog Converter). In one embodiment, this D/A operates at an operational frequency of approximately 10 GHz. The now analog signal is then provided to a BPF (Band Pass Filter) that outputs a time spread symbol sequence that is representative of the estimates of the UWB pulses that are originally provided at the transmitter end of the communication channel.

FIG. 17A, FIG. 17B, FIG. 18A, FIG. 18B, FIG. 19, and FIG. 20 are flowcharts illustrating various embodiments of piconet operating methods that are performed to minimize narrowband interference according to the invention.

Figure 17:
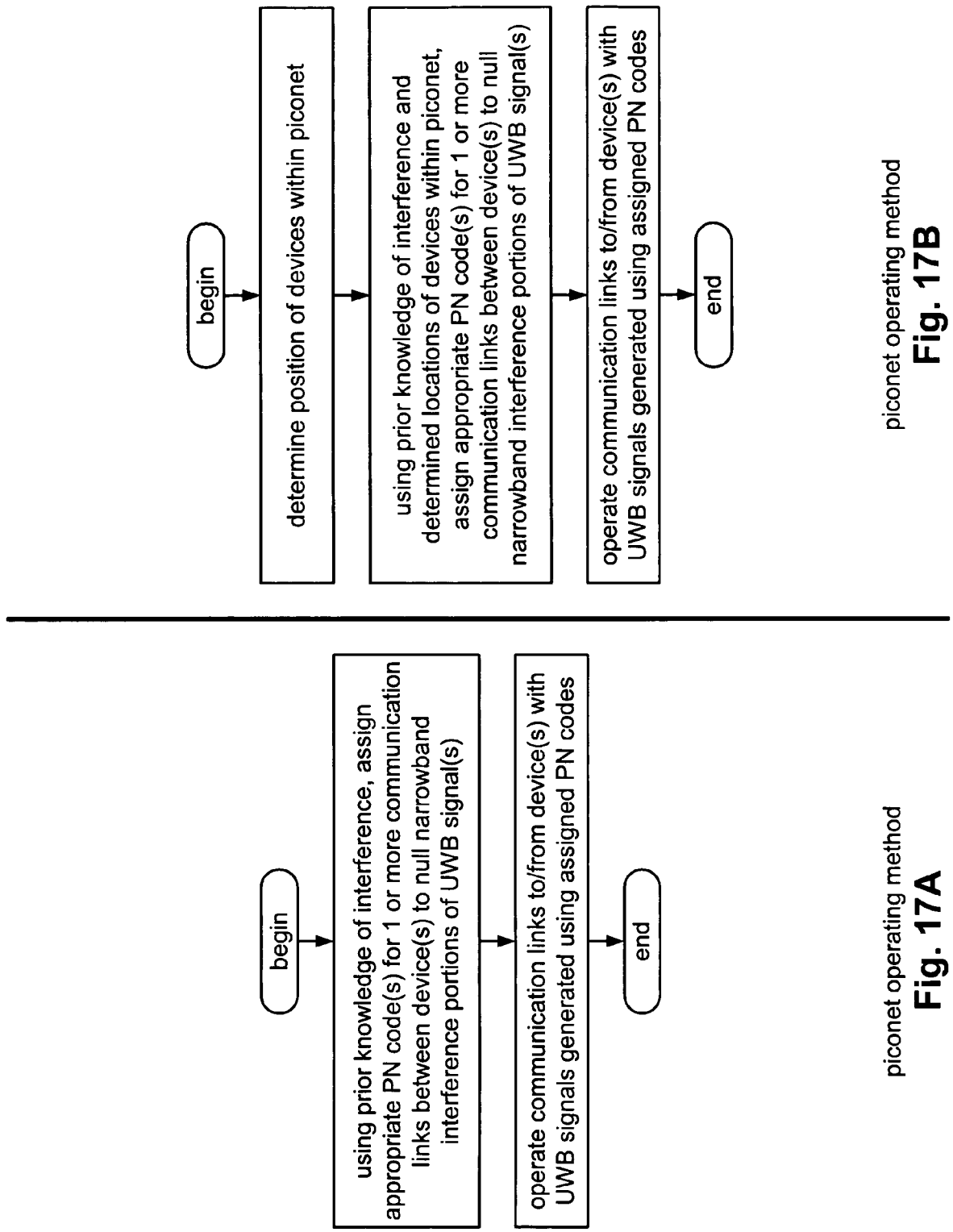
FIG. 17A, FIG. 17B, FIG. 18A, FIG. 18B, FIG. 19, and FIG. 20 are flowcharts illustrating various embodiments of piconet operating methods that are performed to minimize narrowband interference according to the invention.

Referring to the FIG. 17A, using prior knowledge of interference, the method assigns appropriate PN code(s) for 1 or more communication links between the device(s) of the piconet to null narrowband interference portions of UWB signal(s) transmitted therein. This prior knowledge of interference may include the locations of the sources of the interference and/or the frequencies around which such interference is substantially centered as well. Then, using these assigned PN codes, the method then operates the respective communication links to/from the device(s) within the piconet with UWB signals generated using assigned PN codes.

Referring to the FIG. 17B, the method begins by determining the positions of the various devices within a piconet. Using prior knowledge of interference and determined locations of devices within piconet, the method then assigns appropriate PN code(s) for 1 or more communication links between the device(s) of the piconet to null narrowband interference portions of UWB signal(s) transmitted therein. Then, using these assigned PN codes, the method then operates the respective communication links to/from the device(s) within the piconet with UWB signals generated using assigned PN codes.

Figure 18:
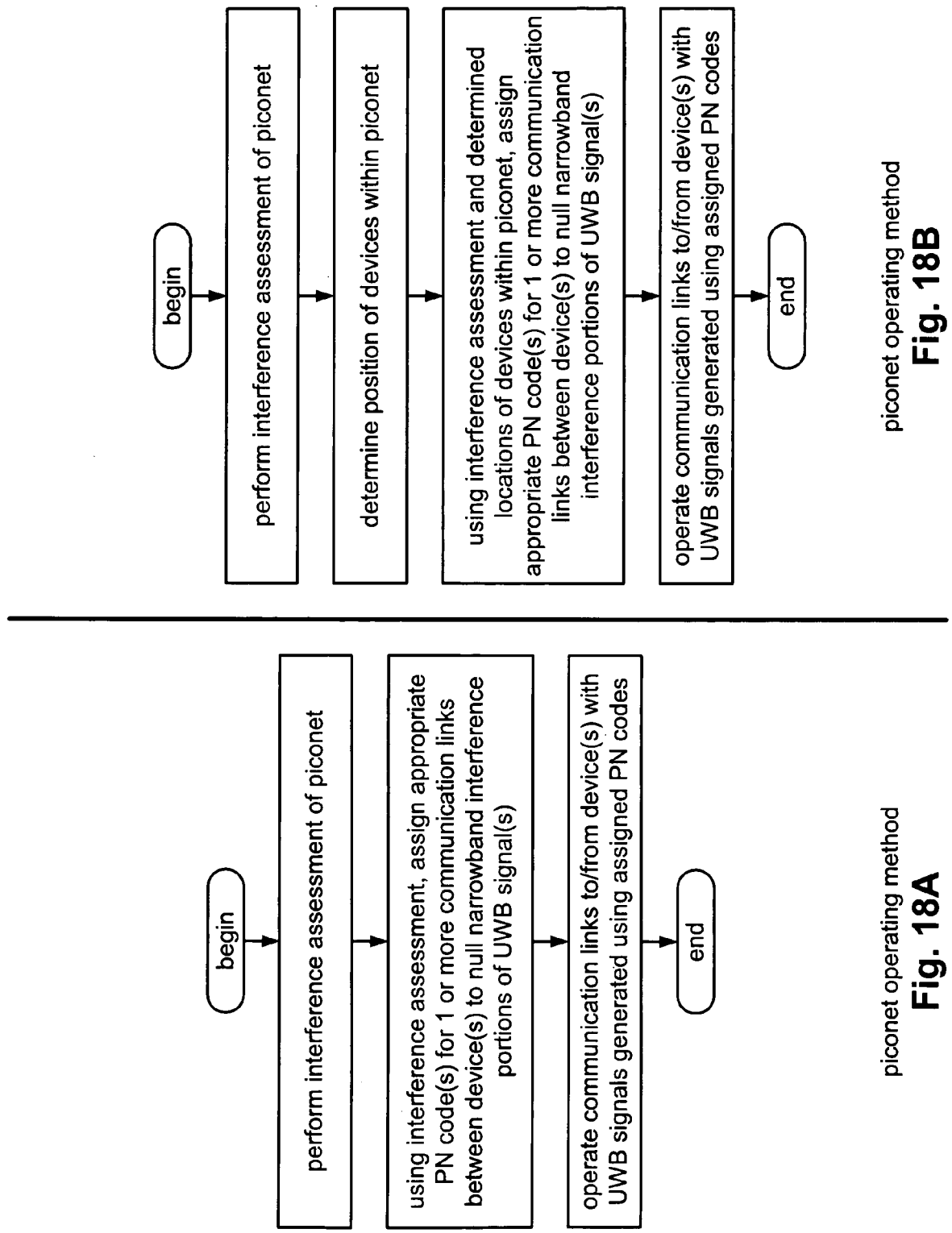

Referring to the FIG. 18A, the method begins by performing interference assessment of piconet. This interference assessment may include determining the locations of the sources of the interference and/or the frequencies around which such interference is substantially centered as well. Using the interference assessment, the method then assigns appropriate PN code(s) for 1 or more communication links between the device(s) of the piconet to null narrowband interference portions of UWB signal(s) transmitted therein. Then, using these assigned PN codes, the method then operates the respective communication links to/from the device(s) within the piconet with UWB signals generated using assigned PN codes.

Referring to the FIG. 18B, the method begins by performing interference assessment of piconet. This interference assessment may include determining the locations of the sources of the interference and/or the frequencies around which such interference is substantially centered as well. The method also performs position determination of the device(s) within the piconet.

Using the interference assessment and the determined locations of the device(s) within piconet, the method then assigns appropriate PN code(s) for 1 or more communication links between the device(s) of the piconet to null narrowband interference portions of UWB signal(s) transmitted therein. Then, using these assigned PN codes, the method then operates the respective communication links to/from the device(s) within the piconet with UWB signals generated using assigned PN codes.

Figure 19:
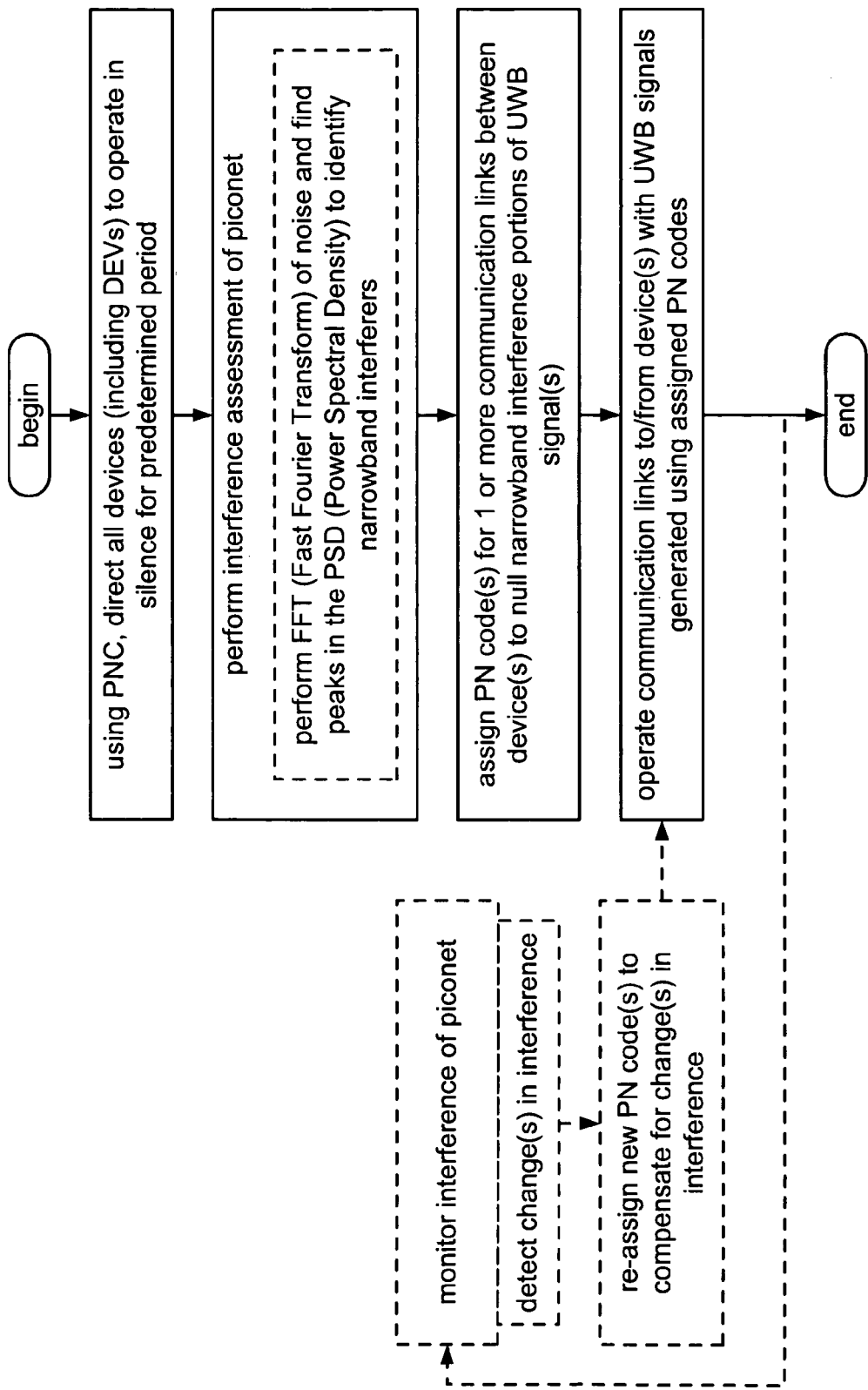

Referring to the FIG. 19, using a PNC within a piconet, the method begins by directing all of the devices therein (including any DEVs) to operate in silence for predetermined period. The method continues by performing interference assessment of piconet. This interference assessment may include determining the locations of the sources of the interference and/or the frequencies around which such interference is substantially centered as well. To perform this interference assessment, the method may perform an FFT (Fast Fourier Transform) of the noise monitored when all of the devices of the piconet operate within the silence mode for the predetermined period of time. Then, the method may involve finding peaks in the PSD (Power Spectral Density) generated by the FFT and to identify narrowband interferers. This may involve identifying the peaks of the PSD that rise above the PSD of the UWB spectrum employed to support the communication within the piconet.

Then, using this information corresponding to the interference assessment, the method then assigns appropriate PN code(s) for 1 or more communication links between the device(s) of the piconet to null narrowband interference portions of UWB signal(s) transmitted therein. Then, using these assigned PN codes, the method then operates the respective communication links to/from the device(s) within the piconet with UWB signals generated using assigned PN codes.

During the operation of the piconet (after the initial beginning of operation of the piconet), the method may also involve monitoring the interference experienced by the piconet. When a change of interference is detected, then the method may proceed to re-assign new PN code(s) to compensate for any change(s) in the interference. If desired, a threshold may be employed such that any change in the interference that exceeds that threshold will be used to make the decision such that new PN codes should be re-assigned. For example, the threshold may be a value such that a change in frequency around which the interference is centered beyond that value will direct the method to re-assign a new PN code. Alternatively, the threshold may be a value such that a change in the magnitude of the peak of the PSD of the interference) beyond that value will direct the method to re-assign a new PN code.

Figure 20:
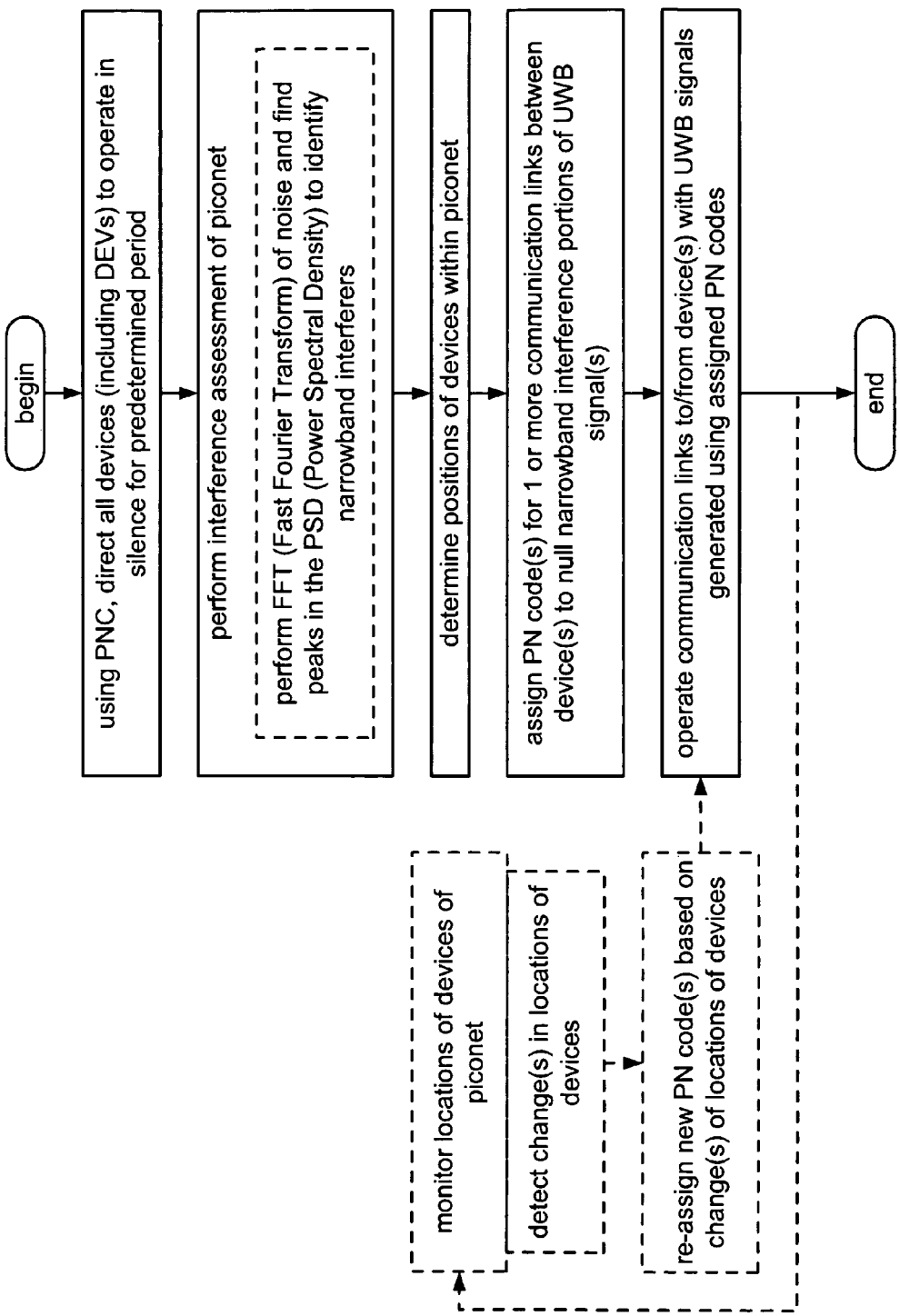

Referring to the FIG. 20, using a PNC within a piconet, the method begins by directing all of the devices therein (including any DEVs) to operate in silence for predetermined period. The method continues by performing interference assessment of piconet. This interference assessment may include determining the locations of the sources of the interference and/or the frequencies around which such interference is substantially centered as well. To perform this interference assessment, the method may perform an FFT (Fast Fourier Transform) of the noise monitored when all of the devices of the piconet operate within the silence mode for the predetermined period of time. Then, the method may involve finding peaks in the PSD (Power Spectral Density) generated by the FFT and to identify narrowband interferers. This may involve identifying the peaks of the PSD that rise above the PSD of the UWB spectrum employed to support the communication within the piconet.

The method then continues by determining the positions of the various devices within a piconet. Then, using this information corresponding to the interference assessment and the determined positions of the devices within the piconet, the method then assigns appropriate PN code(s) for 1 or more communication links between the device(s) of the piconet to null narrowband interference portions of UWB signal(s) transmitted therein. Then, using these assigned PN codes, the method then operates the respective communication links to/from the device(s) within the piconet with UWB signals generated using assigned PN codes.

During the operation of the piconet (after the initial beginning of operation of the piconet), the method may also involve monitoring the locations of the various devices within the piconet. When a change of the location of 1 or more devices within the piconet is detected, then the method may proceed to re-assign new PN code(s) to compensate for any change(s) in the locations of the devices. If desired, a threshold may be employed such that any change in the location that exceeds that threshold will be used to make the decision such that new PN codes should be re-assigned. For example, the threshold may be a value such that a change in location of a distance that is greater than that value will direct the method to re-assign a new PN code.

It is also noted that the various methods described here within the FIG. 17A, FIG. 17B, FIG. 18A, FIG. 18B, FIG. 19, and FIG. 20 may also be performed within the appropriate device and/or system embodiments described within other portions of this specification.

In view of the above detailed description of the invention and associated drawings, other modifications and variations will now become apparent. It should also be apparent that such other modifications and variations may be effected without departing from the spirit and scope of the invention.

What is claimed is:

1. A piconet that employs PN (Pseudo-Noise) codes to spread UWB (Ultra Wide Band) pulses to minimize narrowband interference, the piconet comprising:

a PNC (piconet coordinator); and a plurality of DEVs (user piconet devices); and wherein:

two devices selected from the plurality of DEVs and the PNC communicate with one another using UWB pulses transmitted across a communication link;

based on narrowband interference within a spectrum of the UWB pulses that are transmitted across the communication link, the PNC assigns a PN code from a plurality of PN codes to spread the UWB pulses transmitted across the communication link;

the assigned PN code has at least one narrowband blocking interval, composed of at least one zero in the assigned PN code, that nulls at least one portion of the spectrum of the UWB pulses around which the narrowband interference is centered thereby eliminating the narrowband interference; and when transmitting a UWB pulse across the communication link, at least one of the two devices spreads the UWB pulse using the PN code that is assigned from the plurality of PN codes.

2. The piconet of claim 1, wherein:
the narrowband interference is centered around a predetermined frequency.

3. The piconet of claim 2, wherein:
the predetermined frequency is at least one of approximately 2.4 GHz (Giga-Hertz) and approximately 5 GHz.

4. The piconet of claim 3, wherein:
the interference centered around approximately 5 GHz is generated by an IEEE (Institute of Electrical & Electronics Engineers) 802.11a WLAN (Wireless Local Area Network); and
the interference centered around approximately 2.4 GHz is generated by an IEEE 802.11b WLAN.

5. The piconet of claim 4, wherein:
a region in which the IEEE 802.11a WLAN operates is predetermined; and
a region in which the IEEE 802.11b WLAN operates is predetermined.

6. The piconet of claim 1, wherein: the PNC
transmits a respective UWB pulse to each DEV within the plurality of DEVs; after receiving its respective UWB pulse, each DEV within the plurality of DEVs transmits at least one additional respective UWB pulse back to the PNC; and
the PNC performs ranging of the relative position of each DEV within the plurality of DEVs using a time duration of a round trip of the respective transmitted UWB pulse and the received at least one additional respective UWB pulse thereby determining the relative distances between the PNC and each DEV within the plurality of DEVs.

7. The piconet of claim 6, wherein:
the PNC assigns the PN code based on the relative distance between the PNC and at least one DEV of the plurality of DEVs.

8. The piconet of claim 6, wherein:
the PNC performs ranging of the relative position of each of the two DEVs of the plurality of DEVs using a time duration of a round trip of a transmitted UWB pulse and a received UWB pulse between them thereby determining the relative distance between the two DEVs of the plurality of DEVs;
one of the two DEVs of the plurality of DEVs provides the ranging information indicating the relative distances between the two DEVs and the PNC; and
the PNC employs the ranging information indicating the relative distances between the PNC and the two DEVs as well as the ranging information indicating the relative distance between the two DEVs to perform triangulation thereby determining the specific locations of the two DEVs with respect to the PNC.

9. The piconet of claim 1, wherein: the PNC includes GPS (Global Positioning System) functionality that is operable to determine the specific location of the PNC within a degree of precision;
each DEV of the plurality of DEVs includes GPS functionality that is operable to determine the specific location of that DEV within the degree of precision; and
each DEV of the plurality of DEVs communicates information corresponding to its specific location to the PNC.

10. The piconet of claim 9, wherein:
the PNC assigns the PN code based on the specific location of at least one DEV of the plurality of DEVs.

11. The piconet of claim 1, wherein:
the PNC includes interference assessment functionality that is operable to identify a frequency around which the narrowband interference is centered.

12. The piconet of claim 11, wherein: the PNC and each DEV of the plurality of DEVs operate in a silence mode for a predetermined period of time;
the PNC monitors noise within the piconet when the PNC and each DEV of the plurality of DEVs operate in the silence mode for the predetermined period of time;
the PNC performs an FFT (Fast Fourier Transform) of the noise thereby generating a PSD (Power Spectral Density) of the noise; and
the PNC identifies a peak within the PSD to identify the frequency around which the narrowband interference is centered.

13. The piconet of claim 11, wherein:
the frequency around which the narrowband interference is centered is at least one of approximately 2.4 GHz (Giga-Hertz) and approximately 5 GHz.

14. The piconet of claim 13, wherein:
the interference centered around approximately 5 GHz is generated by an IEEE (Institute of Electrical & Electronics Engineers) 802.11a WLAN (Wireless Local Area Network); and
the interference centered around approximately 2.4 GHz is generated by an IEEE 802.11b WLAN.

15. The piconet of claim 1, wherein:
the UWB pulses are implemented according to CDMA (Code Division Multiple Access).

16. The piconet of claim 1, wherein:
the UWB pulses are implemented according to DSSS (Direct Sequence Spread Spectrum).

17. The piconet of claim 1, wherein:
based on a change in a frequency around which the narrowband interference is centered, the PNC re-assigns a different PN code of the plurality of PN codes to spread the UWB pulses transmitted across the communication link.

18. The piconet of claim 1, wherein:
based on a change in a position of at least one of a DEV of the plurality of DEVs and the PNC, the PNC re-assigns a different PN code of the plurality of PN codes to spread the UWB pulses transmitted across the communication link.

19. The piconet of claim 1, wherein:
the PNC sets up p2p (peer to peer)communication between two DEVs of the plurality of DEVs; and
at least one additional PN code of the plurality of PN codes is employed to spread the UWB pulses that are transmitted between the two DEVs of the plurality of DEVs that communicate via p2p communication.

20. The piconet of claim 1, wherein:
the UWB pulses are generated using a frequency band of a UWB frequency spectrum that spans from approximately 3.1 GHz (Giga-Hertz) to approximately 10.6 GHz;
the UWB frequency spectrum is divided into a plurality of frequency bands; and each frequency band of the plurality of frequency bands has a bandwidth of approximately 500 MHz (Mega-Hertz).

21. A piconet that employs PN (Pseudo-Noise) codes to spread UWB (Ultra Wide Band) pulses to minimize narrowband interference, the piconet comprising:
 a PNC (piconet coordinator); and
 a plurality of DEVs (user piconet devices); and wherein:
 the PNC transmits a respective UWB pulse to each DEV within the plurality of communication devices via a respective communication link of a plurality of communication links that couple the PNC to the plurality of DEVs;
 after receiving its respective UWB pulse, each DEV within the plurality of DEVs transmits at least one additional respective UWB pulse back to the PNC;
 the PNC performs ranging of the relative position of each DEV within the plurality of DEVs using a time duration of a round trip of the respective transmitted UWB pulse and the received at least one additional respective UWB pulse thereby determining the relative distances between the PNC and each DEV within the plurality of DEVs;
 based on narrowband interference within a spectrum of UWB pulses that are transmitted across one respective communication link and based on the relative distance between the PNC and at least one DEV of the plurality of DEVs, the PNC assigns a PN code from a plurality of PN codes to spread the UWB pulses transmitted across the one respective communication link;
 the assigned PN code has at least one narrowband blocking interval, composed of at least one zero in the assigned PN code, that nulls at least one portion of the spectrum of the UWB pulses around which the narrowband interference is centered thereby eliminating the narrowband interference; and
 when transmitting a UWB pulse across the one respective communication link, at least one DEV of the plurality of DEVs and the PNC spreads the UWB pulse using the PN code that is assigned from the plurality of PN codes.

22. The piconet of claim 21, wherein:
 the narrowband interference is centered around a predetermined frequency.

23. The piconet of claim 22, wherein:
 the predetermined frequency is at least one of approximately 2.4 GHz (Giga-Hertz) and approximately 5 GHz.

24. The piconet of claim 23, wherein:
 the interference centered around approximately 5 GHz is generated by an IEEE (Institute of Electrical & Electronics Engineers) 802.11a WLAN (Wireless Local Area Network); and
 the interference centered around approximately 2.4 GHz is generated by an IEEE 802.11b WLAN.

25. The piconet of claim 24, wherein:
 a region in which the IEEE 802.11a WLAN operates is predetermined; and
 a region in which the IEEE 802.11b WLAN operates is predetermined.

26. The piconet of claim 21, wherein:
 the PNC performs ranging of the relative position of each of the DEVs of the plurality of DEVs using a time duration of a round trip of a transmitted UWB pulse and a received UWB pulse between them thereby determining the relative distance between the two DEVs of the plurality of DEVs;
 one of the two DEVs of the plurality of DEVs provides the ranging information indicating the relative distances between the two DEVs and the PNC; and
 the PNC employs the ranging information indicating the relative distances between the PNC and the two DEVs as well as the ranging information indicating the relative distance between the two DEVs to perform triangulation thereby determining the specific locations of the two DEVs.

27. The piconet of claim 21, wherein:
 the PNC includes interference assessment functionality that is operable to identify a frequency around which the narrowband interference is centered.

28. The piconet of claim 27, wherein:
 the PNC and each DEV of the plurality of DEVs operate in a silence mode for a predetermined period of time;
 the PNC monitors noise within the piconet when the PNC and each DEV of the plurality of DEVs operate in the silence mode for the predetermined period of time;
 the PNC performs an FFT (Fast Fourier Transform) of the noise thereby generating a PSD (Power Spectral Density) of the noise; and
 the PNC identifies a peak within the PSD to identify the frequency around which the narrowband interference is centered.

29. The piconet of claim 27, wherein:
 the frequency around which the narrowband interference is centered is at least one of approximately 2.4 GHz (Giga-Hertz) and approximately 5 GHz.

30. The piconet of claim 29, wherein:
 the interference centered around approximately 5 GHz is generated by an IEEE (Institute of Electrical & Electronics Engineers) 802.11a WLAN (Wireless Local Area Network); and
 the interference centered around approximately 2.4 GHz is generated by an IEEE 802.11b WLAN.

31. The piconet of claim 21, wherein:
 the UWB pulses are implemented according to at least one of CDMA (Code Division Multiple Access) and DSSS (Direct Sequence Spread Spectrum).

32. The piconet of claim 21, wherein:
 based on a change in a frequency around which the narrowband interference is centered, the PNC re-assigns a different PN code of the plurality of PN codes to spread the UWB pulses transmitted across the one respective communication link.

33. The piconet of claim 21, wherein:
 based on a change in a position of at least one of a DEV of the plurality of DEVs and the PNC, the PNC re-assigns a different PN code of the plurality of PN codes to spread the UWB pulses transmitted across the one respective communication link.

34. The piconet of claim 21, wherein:
 the PNC sets up p2p (peer to peer) communication between two DEVs of the plurality of DEVs; and
 at least one additional PN code of the plurality of PN codes is employed to spread the UWB pulses that are transmitted between the two DEVs of the plurality of DEVs.

35. The piconet of claim 21, wherein:
 the UWB pulses are generated using a frequency band of a UWB frequency spectrum that spans from approximately 3.1 GHz (Giga-Hertz) to approximately 10.6 GHz;
 the UWB frequency spectrum is divided into a plurality of frequency bands; and each frequency band of the plurality of frequency bands has a bandwidth of approximately 500 MHz (Mega-Hertz).

36. A piconet that employs PN (Pseudo-Noise) codes to spread UWB (Ultra Wide Band) pulses to minimize narrowband interference, the piconet comprising:
 a PNC (piconet coordinator); and a plurality of DEVs (user piconet devices); and wherein:
two devices selected from the plurality of DEVs and the PNC communicate with one another using UWB pulses transmitted across a communication link;
based on narrowband interference within a spectrum of the UWB pulses that are transmitted across the communication link, the PNC assigns a PN code from a plurality of PN codes to spread the UWB pulses transmitted across the communication link;
the assigned PN code has at least one narrowband blocking interval, composed of at least one zero in the assigned PN code, that nulls at least one portion of the spectrum of the UWB pulses around which the narrowband interference is centered thereby eliminating the narrowband interference;
when transmitting a UWB pulse across the communication link, at least one of the two devices spreads the UWB pulse using the PN code that is assigned from the plurality of PN codes; and
the PNC includes interference assessment functionality that is operable to identify a frequency around which the narrowband interference is centered.

37. The piconet of claim 36, wherein:
the PNC and each DEV of the plurality of DEVs operate in a silence mode for a predetermined period of time; the PNC monitors noise within the piconet when the PNC and each DEV of the plurality of DEVs operate in the silence mode for the predetermined period of time; the PNC performs an FFT (Fast Fourier Transform) of the noise thereby generating a PSD (Power Spectral Density) of the noise; and
the PNC identifies a peak within the PSD to identify the frequency around which the narrowband interference is centered.

38. The piconet of claim 36, wherein:
the frequency around which the narrowband interference is centered is at least one of approximately 2.4 GHz (Giga-Hertz) and approximately 5 GHz.

39. The piconet of claim 38, wherein:
the interference centered around approximately 5 GHz is generated by an IEEE (Institute of Electrical & Electronics Engineers) 802.11a WLAN (Wireless Local Area Network); and
the interference centered around approximately 2.4 GHz is generated by an IEEE 802.11b WLAN.

40. The piconet of claim 36, wherein:
the PNC transmits a respective UWB pulse to each DEV within the plurality of DEVs;
after receiving its respective UWB pulse, each DEV within the plurality of DEVs transmits at least one additional respective UWB pulse back to the PNC; and
the PNC performs ranging of the relative position of each DEV within the plurality of DEVs using a time duration of a round trip of the respective transmitted UWB pulse and the received at least one additional respective UWB pulse thereby determining the relative distances between the PNC and each DEV within the plurality of DEVs.

41. The piconet of claim 40, wherein:
the PNC assigns the PN code based on the relative distance between the PNC and at least one DEV of the plurality of DEVs.

42. The piconet of claim 40, wherein:
the PNC performs ranging of the relative position of each of the two DEVs of the plurality of DEVs using a time duration of a round trip of a transmitted UWB pulse and a received UWB pulse between them thereby determining the relative distances between the two DEVs of the plurality of DEVs;
one of the two DEVs of the plurality of DEVs provides the ranging information indicating the relative distances between the two DEVs and the PNC; and
the PNC employs the ranging information indicating the relative distances between the PNC and the two DEVs as well as the ranging information indicating the relative distance between the two DEVs to perform triangulation thereby determining the specific locations of the two DEVs.

43. The piconet of claim 36, wherein:
the PNC includes GPS (Global Positioning System) functionality that is operable to determine the specific location of the PNC within a degree of precision;
each DEV of the plurality of DEVs includes GPS functionality that is operable to determine the specific location of that DEV within the degree of precision; and
each DEV of the plurality of DEVs communicates information corresponding to its specific location to the PNC.

44. The piconet of claim 43, wherein:
the PNC assigns the PN code based on the specific location of at least one DEV of the plurality of DEVs.

45. The piconet of claim 36, wherein:
based on a change in a frequency around which the narrowband interference is centered, the PNC re-assigns a different PN code of the plurality of PN codes to spread the UWB pulses transmitted across the communication link.

46. The piconet of claim 36, wherein:
based on a change in a position of at least one of a DEV of the plurality of DEVs and the PNC, the PNC re-assigns a different PN code of the plurality of PN codes to spread the UWB pulses transmitted across the communication link.

47. The piconet of claim 36, wherein:
the UWB pulses are generated using a frequency band of a UWB frequency spectrum that spans from approximately 3.1 GHz (Giga-Hertz) to approximately 10.6 GHz;
the UWB frequency spectrum is divided into a plurality of frequency bands; and
each frequency band of the plurality of frequency bands has a bandwidth of approximately 500 MHz (Mega-Hertz).

48. A piconet that employs PN (Pseudo-Noise) codes to spread UWB (Ultra Wide Band) pulses to minimize narrowband interference, the piconet comprising:
a PNC (piconet coordinator) that operates as a master device; and
a plurality of DEVs (user piconet devices) that operate as slave devices with respect to the PNC that operates as the master device; and wherein:
two devices selected from the plurality of DEVs and the PNC communicate with one another using UWB pulses transmitted across a communication link;
based on narrowband interference within a spectrum of the UWB pulses that are transmitted across the communication, link the PNC assigns a PN code from a plurality of PN codes to spread the UWB pulses transmitted across the communication link;
the assigned PN code has at least one narrowband blocking interval, composed of at least one zero in the assigned PN code, that nulls at least one portion of the spectrum of the UWB pulses around which the narrowband interference is centered thereby eliminating the narrowband interference;

when transmitting a UWB pulse across the communication link, at least one of the two devices spreads the UWB pulse using the PN code that is assigned from the plurality of PN codes; and the narrowband interference is centered around a predetermined frequency.

49. The piconet of claim 48, wherein:
the predetermined frequency is at least one of approximately 2.4 GHz (Giga-Hertz) and approximately 5 GHz.

50. The piconet of claim 49, wherein:
the interference centered around approximately 5 GHz is generated by an IEEE (Institute of Electrical & Electronics Engineers) 802.11a WLAN (Wireless Local Area Network); and
the interference centered around approximately 2.4 GHz is generated by an IEEE 802.11b WLAN.

51. The piconet of claim 50, wherein:
a region in which the IEEE 802.11a WLAN operates is predetermined; and
a region in which the IEEE 802.11b WLAN operates is predetermined.

52. The piconet of claim 48, wherein: the PNC sets up p2p (peer to peer) communication between two DEVs of the plurality of DEVs; and
at least one additional PN code of the plurality of PN codes is employed to spread the UWB pulses that are transmitted between the two DEVs of the plurality of DEVs.

53. The piconet of claim 48, wherein:
based on a change in a frequency around which the narrowband interference is centered, the PNC re-assigns a different PN code of the plurality of PN codes to spread the UWB pulses transmitted across the communication link.

54. The piconet of claim 48, wherein:
based on a change in a position of at least one of a DEV of the plurality of DEVs and the PNC, the PNC re-assigns a different PN code of the plurality of PN codes to spread the UWB pulses transmitted across the communication link.

55. The piconet of claim 48, wherein:
the UWB pulses are generated using a frequency band of a UWB frequency spectrum that spans from approximately 3.1 GHz (Giga-Hertz) to approximately 10.6 GHz;
the UWB frequency spectrum is divided into a plurality of frequency bands; and
each frequency band of the plurality of frequency bands has a bandwidth of approximately 500 MHz (Mega-Hertz).

56. A piconet operating method, the method comprising:
assigning a PN (Pseudo-Noise) code that is operable to spread UWB (Ultra Wide Band) pulses that are transmitted across a communication link that communicatively couples two devices within a piconet that includes a plurality of DEVs (user piconet devices) and a PNC (piconet coordinator);
using at least one zero within the PN code, nulling at least a portion of a spectrum of the UWB pulses;
wherein the at least one zero within the PN code spectrally conincides with narrowband interference thereby nulling the narrowband interference; and
operating the communication link that communicatively couples two devices using the assigned PN code.

57. The method of claim 56, wherein:
the narrowband interference is centered around a predetermined frequency.

58. The method of claim 57, wherein:
the predetermined frequency is at least one of approximately 2.4 GHz (Giga-Hertz) and approximately 5 GHz.

59. The method of claim 58, wherein:
the interference centered around approximately 5 GHz is generated by an IEEE (Institute of Electrical & Electronics Engineers) 802.11a WLAN (Wireless Local Area Network); and
the interference centered around approximately 2.4 GHz is generated by an IEEE 802.11b WLAN.

60. The method of claim 59, wherein:
a region in which the IEEE 802.11a WLAN operates is predetermined; and
a region in which the IEEE 802.11b WLAN operates is predetermined.

61. The method of claim 56, further comprising:
determining the relative distance between the PNC and at least one DEV of the plurality of devices within the piconet using ranging that employs a time duration of a round trip of a transmitted UWB pulse and a received UWB pulse between the PNC and the at least one DEV of the plurality of devices; and
assigning the PN code based on the relative distance between the PNC and the at least one DEV of the plurality of DEVs.

62. The method of claim 56, further comprising:
determining the position of each DEV of the plurality of DEVs and the PNC using GPS (Global Positioning System) functionality contained within each DEV of the plurality of DEVs and the PNC;
wherein the GPS (Global Positioning System) functionality is operable to determine the specific location of the respective device within a degree of precision; and
assigning the PN code based on the positions of the PNC and each DEV of the plurality of DEVs.

63. The method of claim 56, further comprising:
based on a change in a frequency around which the narrowband interference is centered, re-assigning a different PN code of the plurality of PN codes to spread the UWB pulses transmitted across the communication link.

64. The method of claim 56, further comprising:
based on a change in a position of at least one of a DEV of the plurality of DEVs and the PNC, re-assigning a different PN code of the plurality of PN codes to spread the UWB pulses transmitted across the communication link.

65. The method of claim 56, further comprising:
performing interference assessment to identify a frequency around which the narrowband interference is centered.

66. The method of claim 65, further comprising:
operating the PNC and each DEV of the plurality of DEVs in a silence mode for a predetermined period of time;
monitoring noise within the piconet when operating the PNC and each DEV of the plurality of DEVs in the silence mode for the predetermined period of time; and
performing an FFT (Fast Fourier Transform) of the noise thereby generating a PSD (Power Spectral Density) of the noise; and
identifying a peak within the PSD to identify the frequency around which the narrowband interference is centered.

67. The method of claim 65, wherein:
the frequency around which the narrowband interference is centered is at least one of approximately 2.4 GHz (Giga-Hertz) and approximately 5 GHz.

68. The method of claim 67, wherein:
the interference centered around approximately 5 GHz is generated by an IEEE (Institute of Electrical & Electronics Engineers) 802.11a WLAN (Wireless Local Area Network); and
the interference centered around approximately 2.4 GHz is generated by an IEEE 802.11b WLAN.

69. A piconet operating method, the method comprising:
assigning a PN (Pseudo-Noise) code that is operable to spread UWB (Ultra Wide Band) pulses that are transmitted across a communication link that communicatively couples two devices within a piconet that includes a plurality of DEVs (user piconet devices) and a PNC (piconet coordinator);
using at least one zero within the PN code, nulling at least a portion of a spectrum of the UWB pulses;
wherein the at least one zero within the PN code spectrally coincides with narrowband interference thereby nulling the narrowband interference; and
operating the communication link that communicatively couples two devices using the assigned PN code; and
wherein the narrowband interference is centered around a predetermined frequency.

70. The method of claim 69, wherein:
the predetermined frequency is at least one of approximately 2.4 GHz (Giga-Hertz) and approximately 5 GHz.

71. The method of claim 70, wherein:
the interference centered around approximately 5 GHz is generated by an IEEE (Institute of Electrical & Electronics Engineers) 802.11a WLAN (Wireless Local Area Network); and
the interference centered around approximately 2.4 GHz is generated by an IEEE 802.11b WLAN.

72. The method of claim 71, wherein:
a region in which the IEEE 802.11a WLAN operates is predetermined; and
a region in which the IEEE 802.11b WLAN operates is predetermined.

73. The method of claim 69, further comprising:
determining the relative distance between the PNC and at least one DEV of the plurality of devices within the piconet using ranging that employs a time duration of a round trip of a transmitted UWB pulse and a received UWB pulse between the PNC and the at least one DEV of the plurality of devices; and
assigning the PN code based on the relative distance between the PNC and the at least one DEV of the plurality of DEVs.

74. The method of claim 69, further comprising:
determining the position of each DEV of the plurality of DEVs and the PNC using GPS (Global Positioning System) functionality contained within each DEV of the plurality of DEVs and the PNC;
wherein the GPS (Global Positioning System) functionality is operable to determine the specific location of the respective device within a degree of precision; and
assigning the PN code based on the positions of the PNC and each DEV of the plurality of DEVs.

75. The method of claim 69, further comprising:
based on a change in a frequency around which the narrowband interference is centered, re-assigning a different PN code of the plurality of PN codes to spread the UWB pulses transmitted across the communication link.

76. The method of claim 69, further comprising:
based on a change in a position of at least one of a DEV of the plurality of DEVs and the PNC, re-assigning a different PN code of the plurality of PN codes to spread the UWB pulses transmitted across the communication link.

77. A piconet operating method, the method comprising:
performing interference assessment of a communication link that communicatively couples two devices within a piconet that includes a plurality of DEVs (user piconet devices) and a PNC (piconet coordinator) to identify a frequency around which the narrowband interference is centered;
assigning a PN (Pseudo-Noise) code that is operable to spread UWB (Ultra Wide Band) pulses that are transmitted across the communication link;
using at least one zero within the PN code, nulling at least a portion of a spectrum of the UWB pulses;
wherein the at least one zero within the PN code spectrally coincides with narrowband interference thereby nulling the narrowband interference; and
operating the communication link that communicatively couples two devices using the assigned PN code.

78. The method of claim 77, further comprising:
operating the PNC and each DEV of the plurality of DEVs in a silence mode for a predetermined period of time;
monitoring noise within the piconet when operating the PNC and each DEV of the plurality of DEVs in the silence mode for the predetermined period of time; and
performing an FFT (Fast Fourier Transform) of the noise thereby generating a PSD (Power Spectral Density) of the noise; and
identifying a peak within the PSD to identify the frequency around which the narrowband interference is centered.

79. The method of claim 77, wherein:
the frequency around which the narrowband interference is centered is at least one of approximately 2.4 GHz (Giga-Hertz) and approximately 5 GHz.

80. The method of claim 79, wherein:
the interference centered around approximately 5 GHz is generated by an IEEE (Institute of Electrical & Electronics Engineers) 802.11a WLAN (Wireless Local Area Network); and
the interference centered around approximately 2.4 GHz is generated by an ILLL 802.11b WLAN.

81. The method of claim 77, further comprising:
determining the relative distance between the PNC and at least one DEV of the plurality of devices within the piconet using ranging that employs a time duration of a round trip of a transmitted UWB pulse and a received UWB pulse between the PNC and the at least one DEV of the plurality of devices; and
assigning the PN code based on the relative distance between the PNC and the at least one DEV of the plurality of DEVs.

82. The method of claim 77, further comprising:
determining the position of each DEV of the plurality of DEVs and the PNC using GPS (Global Positioning System) functionality contained within each DEV of the plurality of DEVs and the PNC;
wherein the GPS (Global Positioning System) functionality is operable to determine the specific location of the respective device within a degree of precision; and assigning the PN code based on the positions of the PNC and each DEV of the plurality of DEVs.

83. The method of claim 77, further comprising:
based on a change in a frequency around which the narrowband interference is centered, re-assigning a different PN code of the plurality of PN codes to spread the UWB pulses transmitted across the communication link.

84. The method of claim 77, further comprising:
based on a change in a position of at least one of a DEV of the plurality of DEVs and the PNC, re-assigning a different PN code of the plurality of PN codes to spread the UWB pulses transmitted across the communication link.

* * * * *

UNITED STATES PATENT AND TRADEMARK OFFICE
CERTIFICATE OF CORRECTION

PATENT NO.        : 7,554,965 B2                                                Page 1 of 1
APPLICATION NO.   : 10/668648
DATED             : June 30, 2009
INVENTOR(S)       : Jeyhan Karaoguz It is certified that error appears in the above-identified patent and that said Letters Patent is hereby corrected as shown below:

Column 30, line 47, in Claim 80: replace "ILLL" with --IEEE--.

Signed and Sealed this

First Day of September, 2009

David J. Kappos
*Director of the United States Patent and Trademark Office*